United States Patent
Adams et al.

(10) Patent No.: US 12,306,930 B2
(45) Date of Patent: May 20, 2025

(54) DYNAMIC MESSAGE ANALYSIS PLATFORM FOR ENHANCED ENTERPRISE SECURITY

(71) Applicant: Proofpoint, Inc., Sunnyvale, CA (US)

(72) Inventors: Joseph Trent Adams, Highlands Ranch, CO (US); Robert Holmes, Boulder, CO (US); Abigail Lauren Berger, Lakewood, CO (US)

(73) Assignee: Proofpoint, Inc., Sunnyvale, CA (US)

( * ) Notice: Subject to any disclaimer, the term of this patent is extended or adjusted under 35 U.S.C. 154(b) by 786 days.

(21) Appl. No.: 17/119,964

(22) Filed: Dec. 11, 2020

(65) Prior Publication Data

US 2021/0182381 A1 Jun. 17, 2021

Related U.S. Application Data

(63) Continuation-in-part of application No. 17/016,980, filed on Sep. 10, 2020, now Pat. No. 11,863,566, and
(Continued)

(51) Int. Cl.
*G06F 21/53* (2013.01)
*G06F 9/54* (2006.01)
(Continued)

(52) U.S. Cl.
CPC .............. *G06F 21/53* (2013.01); *G06F 9/547* (2013.01); *G06F 16/955* (2019.01); *G06N 20/00* (2019.01)

(58) Field of Classification Search
CPC ........ G06F 21/53; G06F 9/547; G06F 16/955; G06N 20/00; H04L 51/234; H04L 51/216;
(Continued)

(56) References Cited

U.S. PATENT DOCUMENTS 9,294,497 B1 * 3/2016 Ben-Or ............... H04L 63/1433
9,635,049 B1 4/2017 Oprea et al.
(Continued)

OTHER PUBLICATIONS

Dewald, Andreas, Thorsten Holz, and Felix C. Freiling. "ADSandbox: Sandboxing JavaScript to fight malicious websites." proceedings of the 2010 ACM Symposium on Applied Computing. 2010. (Year: 2010).*

(Continued)

*Primary Examiner* — Jung W Kim
*Assistant Examiner* — Sameera Wickramasuriya
(74) *Attorney, Agent, or Firm* — Banner & Witcoff, Ltd.

(57) ABSTRACT

Aspects of the disclosure relate to dynamic message analysis using machine learning. A computing platform may apply a security scoring process to an endpoint relationship to compute a weighted security score for the endpoint relationship. Subsequently, the computing platform may determine a weighted grade for the endpoint relationship based on the weighted security score for the endpoint relationship. Based on identifying that the weighted grade exceeds a predetermined threshold, the computing platform may tag the endpoint relationship as compromised. Subsequently, the computing platform may monitor an electronic messaging server to detect messages corresponding to the compromised endpoint relationship. Based on detecting that the electronic messaging server has received a first message, corresponding to an endpoint of the compromised endpoint relationship, the computing platform may rewrite a URL included in the first message to point to a security service that is configured to open the URL in an isolation environment.

20 Claims, 27 Drawing Sheets

Related U.S. Application Data a continuation-in-part of application No. 17/016,819, filed on Sep. 10, 2020, now Pat. No. 11,729,200.

(60) Provisional application No. 62/947,050, filed on Dec. 12, 2019.

(51) Int. Cl.
*G06F 16/955* (2019.01)
*G06N 20/00* (2019.01)

(58) Field of Classification Search
CPC . H04L 63/1425; H04L 67/02; H04L 63/1483; G06Q 10/107
See application file for complete search history.

(56) References Cited

U.S. PATENT DOCUMENTS

| | | | | |
|---|---|---|---|---|
| 10,154,056 | B2* | 12/2018 | Kennedy | H04L 63/1466 |
| 10,868,825 | B1* | 12/2020 | Dominessy | H04L 43/045 |
| 11,063,897 | B2* | 7/2021 | Kessler | G06Q 10/107 |
| 11,178,168 | B1* | 11/2021 | Lin | H04L 63/1433 |
| 11,411,990 | B2* | 8/2022 | Pandey | H04L 63/1466 |
| 2005/0204009 | A1* | 9/2005 | Hazarika | G06Q 10/107 709/206 |
| 2006/0168024 | A1* | 7/2006 | Mehr | H04L 63/14 709/206 |
| 2009/0122704 | A1 | 5/2009 | DeVal et al. | |
| 2009/0216842 | A1* | 8/2009 | Risher | G06Q 10/107 709/206 |
| 2010/0192224 | A1* | 7/2010 | Ferri | G06F 21/53 726/23 |
| 2012/0174219 | A1 | 7/2012 | Hernandez et al. | |
| 2013/0333026 | A1* | 12/2013 | Starink | G06F 16/9558 726/22 |
| 2016/0094566 | A1* | 3/2016 | Parekh | H04L 63/145 726/1 |
| 2016/0330219 | A1* | 11/2016 | Hasan | G06N 20/00 |
| 2018/0013790 | A1* | 1/2018 | Xavier | G06Q 10/107 |
| 2018/0152471 | A1* | 5/2018 | Jakobsson | H04L 63/1425 |
| 2019/0312729 | A1 | 10/2019 | Sachtjen et al. | |
| 2020/0410894 | A1* | 12/2020 | May | G09B 19/0053 |
| 2021/0185075 | A1 | 6/2021 | Adams | |

OTHER PUBLICATIONS

Reis, Charles, Alexander Moshchuk, and Nasko Oskov. "Site isolation: Process separation for web sites within the browser." 28th USENIX Security Symposium (USENIX Security 19). 2019. (Year: 2019).*
May 6, 2021 (EP) Extended European Search Report—App. 20213921.8.
May 7, 2021 (EP) Extended European Search Report—App. 20213922.6.
Mar. 6, 2023—(US) Notice of Allowance—U.S. Appl. No. 17/016,980.
Mar. 23, 2023—(US) Notice of Allowance—U.S. Appl. No. 17/016,819.
Alsubhi et al., "Alert Prioritization in Intrusion Detection Systems", NOMS 2008-2008 IEEE Network Operations and Management Symposium. IEEE, 2008 (Year: 2008).
Antonakakis, et al. "Detecting Malware Domains at the Upper DNS Hierarchy" USENIX Security Symposium, vol. 11.2011. (Year: 2011).
Apr. 11, 2023—(EP) Office Action—App 20213921.8.
Apr. 11, 2023—(EP) Office Action—App 20213922.6.
Apr. 13, 2023—(US) Final Office Action—U.S. Appl. No. 17/016,980.
Apr. 11, 2023—(EP) Office Action—App 20213925.9.
Rsa: "How the Libraesva URLSand sandboxing service works", Sep. 15, 2016, pp. 1-9, XP093036672, Retrieved from the Internet: URL:https://docs.libraesva.com/knowledgebase/how-the-esva-uri-sandboxing-service-works/ [retrieved on Mar. 31, 2023].
Aug. 2, 2022—(US) Non-Final Office Action—U.S. Appl. No. 17/016,980.
May 10, 2021 (EP) Extended European Search Report—App. 20213925.
Aug. 2, 2023—(US) Notice of Allowance—U.S. Appl. No. 17/016,980.
Jan. 25, 2024—(US) Notice of Allowance—U.S. Appl. No. 18/213,323.
Feng, Yu, et al. "Automated systhesis of semantic malware signatures using maximum satisfiability." arXiv preprint arXiv: 1608.06254 (2016).
Arora, Anshul and Sateesh K. Peddoju. "Minimizing network traffice features for android mobile malware detection." Proceedings of the 18th international conference on distributed computing and networking, 2017.
Jul. 24, 2024—(US) Non-Final Office Action—U.S. Appl. No. 18/385,614.
Suman Patro "Comparative study of middleware solutions for control and monitoring systems" Nov. 23, 2017.
Dec. 12, 2024—(US) Office Action—U.S. Appl. No. 18/385,614.

* cited by examiner

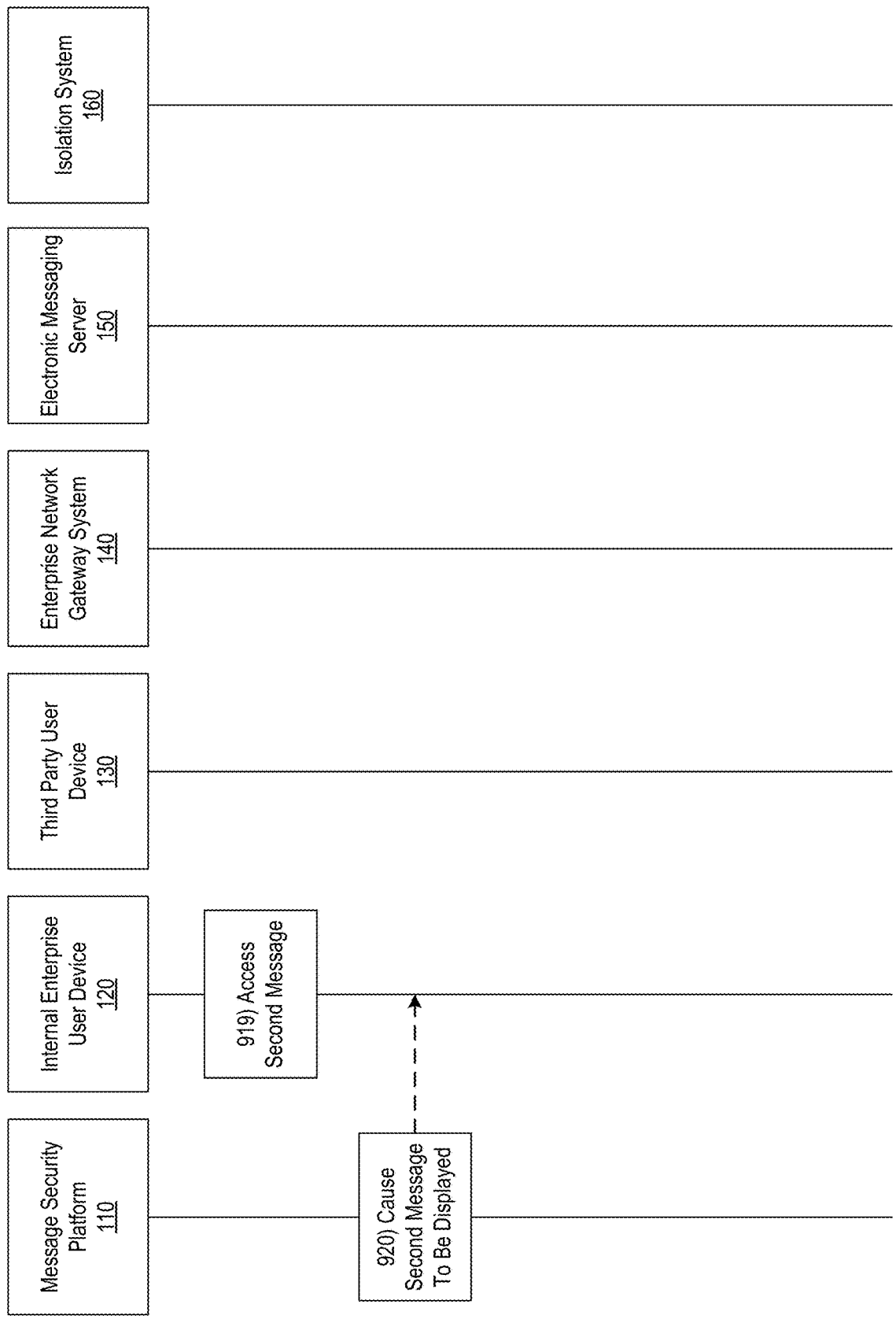

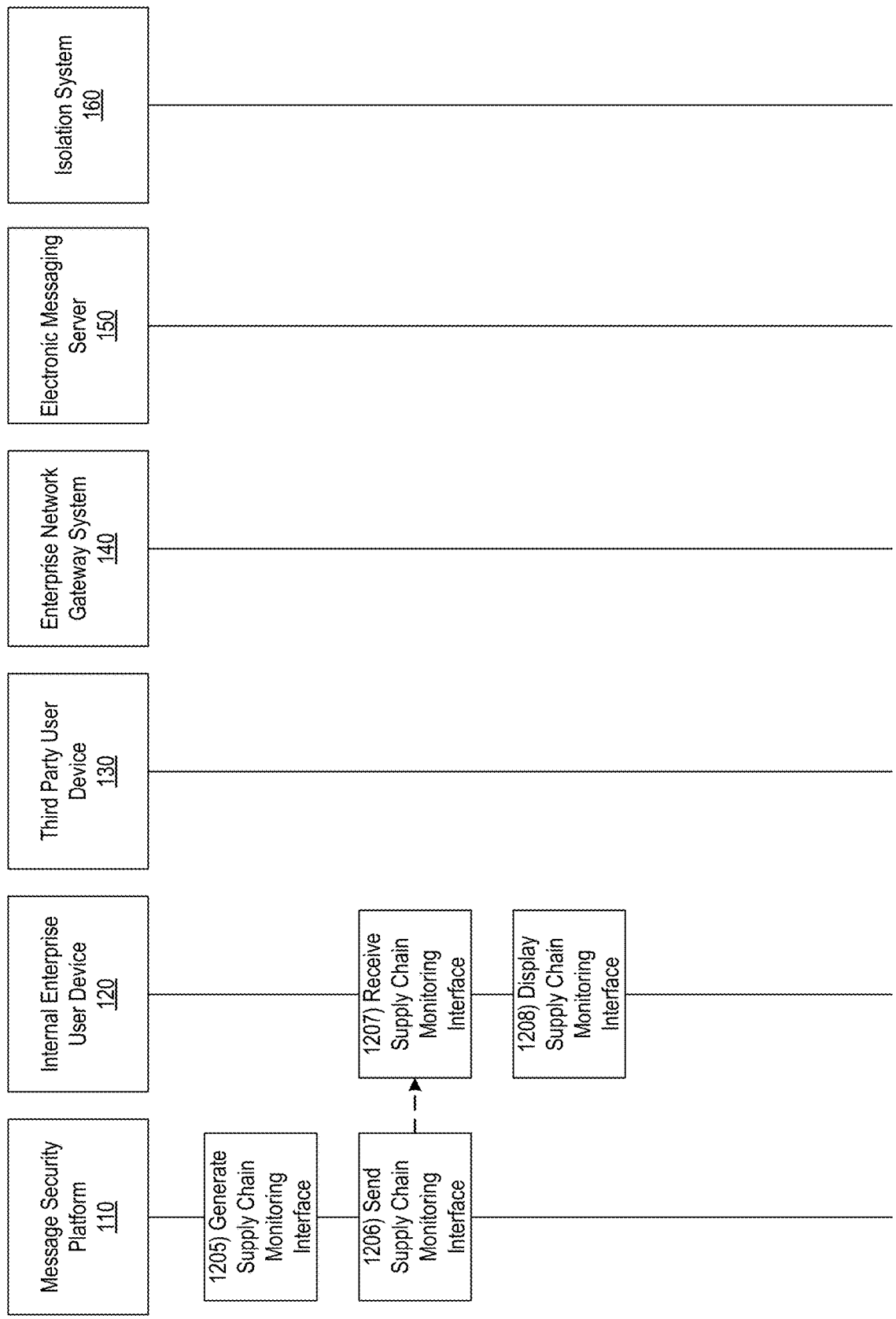

Supply Chain Security Relationships

- The Endpoint Relationship includes, and is made up of scores applied to the following components:
  - each Endpoint,
  - the Relationship between them,
  - and the Directionality of the Relationship (which may be directional from one endpoint to the other, or bidirectional).
- An Endpoint may be any one of:
  - an end user sending and/or receiving messages,
  - an application sending/receiving automated transactional messages, or
  - server handling messages on behalf of others (e.g. users, applications).
- The composite Endpoint Relationship score is computed based upon specific weighting applied to each component score, and a final weighted grade applied.
- A message sent between unknown Endpoints may transit any number of relay points.
  - The current Endpoint Relationship score may be impacted by (invisible to us) transit points.
  - In some cases, messages sent as part of the same Endpoint Relationship travels via different transit points.
  - We can infer a compromise by inspection of the messages sent between Endpoints.

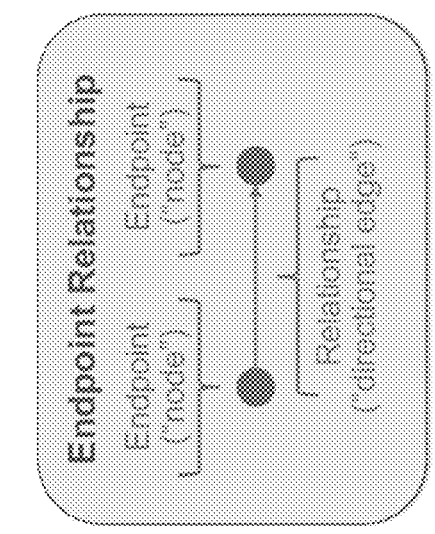

FIG. 15

DYNAMIC MESSAGE ANALYSIS PLATFORM FOR ENHANCED ENTERPRISE SECURITY

CROSS-REFERENCE TO RELATED APPLICATIONS

This application claims the benefit of priority to and is a non-provisional of U.S. Provisional Patent Application Ser. No. 62/947,050, filed Dec. 12, 2019, and entitled "Supply Chain Email Security." In addition, this application claims the benefit of priority to and is a continuation in part of U.S. patent application Ser. No. 17/016,819, filed Sep. 10, 2020, and entitled "Dynamic Message Analysis Platform for Enhanced Enterprise Security" and U.S. patent application Ser. No. 17/016,980, filed Sep. 10, 2020, and entitled "Dynamic Message Analysis Platform for Enhanced Enterprise Security," both of which also claim the benefit of priority to U.S. Provisional Patent Application Ser. No. 62/947,050, filed Dec. 12, 2019, and entitled "Supply Chain Email Security." Each of the foregoing applications is incorporated by reference herein in its entirety.

TECHNICAL FIELD

Aspects of the disclosure relate to message processing and management systems, data processing methods, machine learning systems, and communication systems and networks. In particular, one or more aspects of the disclosure relate to identifying compromised domains within a supply chain network and executing enhanced protection actions accordingly.

BACKGROUND

For many enterprise organizations, it may be essential to enable receipt of legitimate electronic communications from external sources (e.g., sources outside of the given organization). Increasingly, however, organizations face various cybersecurity threats through such electronic communications. Various methods of message analysis have been developed to combat these threats. When analyzing messages and their contents, however, it remains difficult to identify compromised domains, impersonated domains, and/or other similar domain-based threats that may be included in and/or otherwise associated with such messages. Additionally, because risks posed by compromised or impersonated domains may arise with regard to both communications both within an enterprise organization (referred to herein as internal communications) and between the enterprise organization and third parties (referred to herein as external communications), attempts to integrate domain analysis techniques into efficient and effective monitoring processes present various technical challenges, particularly when trying to balance enterprise network security against the optimal consumption of computing resources, such as processing power and network bandwidth.

SUMMARY

Aspects of the disclosure provide technical solutions that overcome one or more of the technical problems described above and/or other technical challenges. For instance, one or more aspects of the disclosure relate to enhancing enterprise security through dynamic message analysis, which may include identifying relationships between endpoints and/or internal and external domains, applying a security scoring process to the relationships, and executing enhanced protection actions with regard to a subset of the relationships as identified in the security scoring process.

In accordance with one or more embodiments, a computing platform having at least one processor, a communication interface, and memory may apply a security scoring process to an endpoint relationship to compute a weighted security score for the endpoint relationship. Subsequently, the computing platform may determine a weighted grade for the endpoint relationship based on the weighted security score for the endpoint relationship. Then, the computing platform may identify that the weighted grade exceeds a predetermined threshold. Based on identifying that the weighted grade exceeds the predetermined threshold, the computing platform may tag the endpoint relationship as compromised. Subsequently, the computing platform may monitor an electronic messaging server to detect messages corresponding to the endpoint relationship that was tagged as compromised. Then, the computing platform may detect that the electronic messaging server has received a first message corresponding to an endpoint of the endpoint relationship that was tagged as compromised, and the first message may include a uniform resource locator (URL). Based on detecting that the electronic messaging server has received the first message corresponding to the endpoint of the endpoint relationship that was tagged as compromised, the computing platform may rewrite the URL to point to a security service that is configured to open the URL in an isolation environment. In this way, the URL included in the message that originated from a compromised endpoint (or that is otherwise associated with a compromised endpoint relationship) may be opened in isolation to protect an end user who receives and/or opens the URL.

In some embodiments, applying the security scoring process to the endpoint relationship to compute the weighted security score for the endpoint relationship may include applying a scoring process to each endpoint of the endpoint relationship to compute a combined endpoint relationship score.

In one or more embodiments, the security service may be hosted by one of: the computing platform or the isolation environment. In one or more embodiments, by rewriting the URL to point to the security service that is configured to open the URL in the isolation environment, the computing platform may cause the isolation environment to: 1) request content corresponding to the URL; 2) receive the content corresponding to the URL; 3) apply one or more security checks to the content corresponding to the URL; 4) render the content corresponding to the URL; and 5) send, based on the rendered content and to a user device, a graphical output.

In one or more instances, sending the graphical output to the user device may enable the user device to interact with the rendered content in the isolation environment. In one or more instances, the computing platform may detect that signals within a second message (e.g., the existence of a URL corresponding to different endpoints than those identified by the endpoint relationship) do not match signals within the first message, and, in response, the computing platform may trigger the second message to be displayed along with a warning label.

In one or more instances, the computing platform may identify a parent organization corresponding to the endpoint relationship that was tagged as compromised. Subsequently, the computing platform may identify additional endpoints associated with the parent organization corresponding to the endpoint relationship that was tagged as compromised. Then, the computing platform may detect that the electronic messaging server has received a second message corresponding to one of the additional endpoints associated with the parent organization corresponding to the endpoint relationship that was tagged as compromised, and the second message may include a second URL. Based on detecting that the electronic messaging server has received the second message corresponding to the one of the additional endpoints associated with the parent organization corresponding to the endpoint relationship that was tagged as compromised, the computing platform may rewrite the second URL to point to the security service that is configured to open the URL in the isolation environment.

In one or more instances, the first message corresponding to the endpoint of the endpoint relationship that was tagged as compromised may be addressed to a first enterprise organization. In one or more instances, the computing platform may detect additional messages corresponding to the endpoint relationship that was tagged as compromised, which may be addressed to users at other enterprise organizations, different than the first enterprise organization. The computing platform may identify a subset of the additional messages that include URLs. The computing platform may rewrite the URLs to point to the security service that is configured to open the URLs in the isolation environment.

In one or more instances, the computing platform may identify a remainder of the additional messages that do not include URLs. The computing platform may cause the remainder of the additional messages to be displayed with a warning label.

In one or more instances, the computing platform may generate a supply chain monitoring interface, where the supply chain monitoring interface includes message security information, and where the supply chain monitoring interface includes one or more selectable elements that, once selected, cause display of information related to malicious messages associated with the endpoint relationship that are sent to an individual enterprise organization and information related to malicious messages associated with the endpoint relationship that are sent to a plurality of enterprise organizations monitored by the computing platform.

In one or more instances, tagging the endpoint relationship as compromised may include one of more of: pushing an alert to one or more user devices indicating that the endpoint relationship that was tagged as compromised is compromised, or configuring the alert for retrieval by the one or more user devices via application protocol interfaces (API).

These and other aspects of the disclosure are described further herein.

BRIEF DESCRIPTION OF THE DRAWINGS

The present disclosure is illustrated by way of example and not limited in the accompanying figures in which like reference numerals indicate similar elements and in which:

FIGS. 9A-9E depict another illustrative event sequence for performing dynamic message analysis and executing enhanced protection actions in accordance with one or more example embodiments;

FIGS. 12A and 12B depict another illustrative event sequence for performing dynamic message analysis and executing enhanced protection actions in accordance with one or more example embodiments;

FIG. 15 depicts an example of an endpoint relationship that may be identified in performing dynamic message analysis and executing enhanced protection actions in accordance with one or more example embodiments.

DETAILED DESCRIPTION

Figure 1:
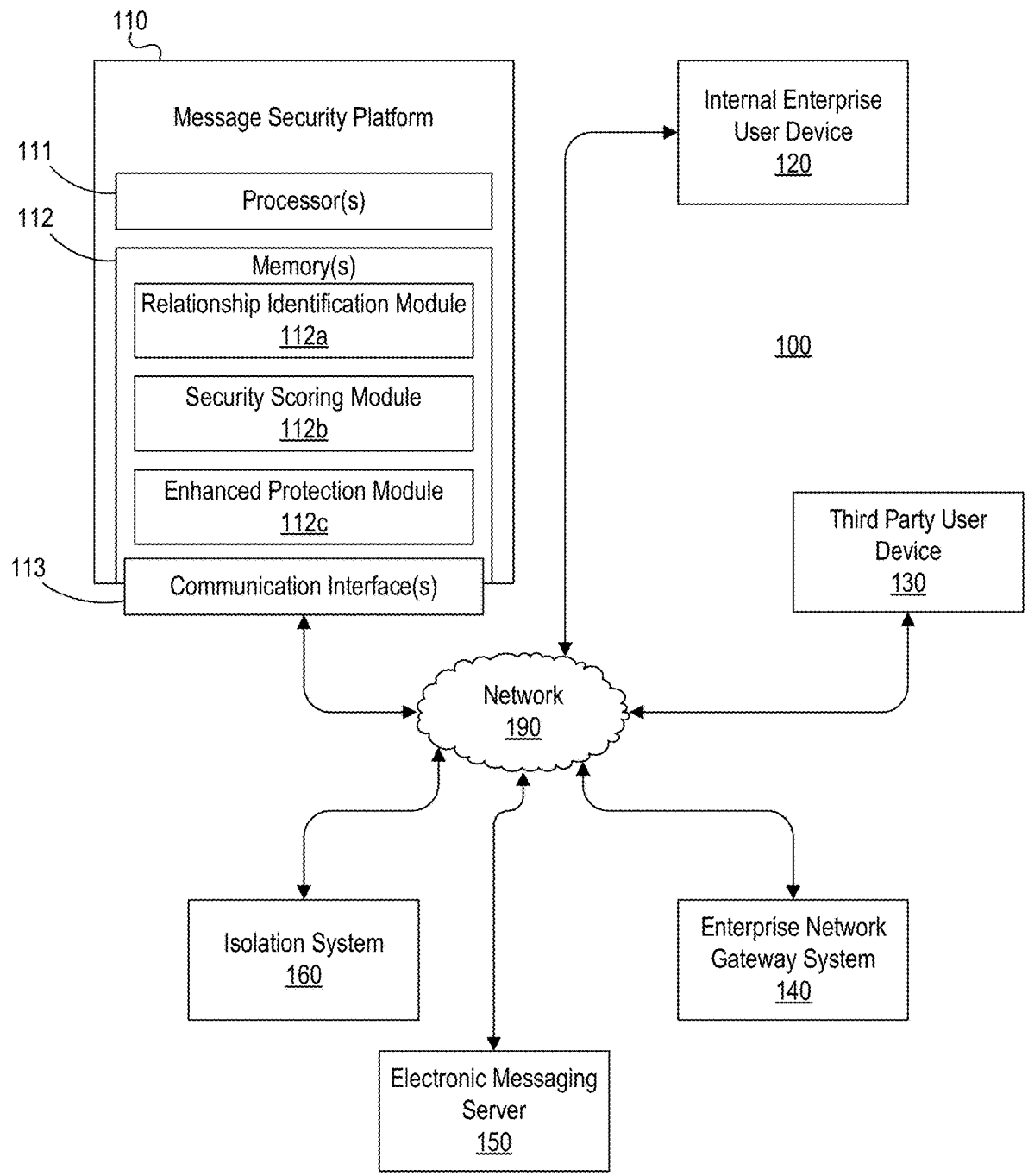
FIG. 1 depicts an illustrative operating environment for performing dynamic message analysis and executing enhanced protection actions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving enterprise security in electronic communications between an organization and its vendors and/or suppliers, trusted third party entities (which may e.g., be part of the organization's supply chain), and/or other entities. More specifically, and as discussed in further detail below, relationships between the organization's domain(s) and external domains (e.g., domains authorized to be used by external parties) may be identified and used as inputs to a security scoring process. In executing this security scoring process, one or more weighted grades may be produced for different domains, and one or more enhanced protection actions may be executed accordingly based on the weighted grades.

One or more aspects of the disclosure thus provide technical solutions to various technical problems associated with enterprise security in the context of electronic messaging. For example, it may be difficult for an enterprise organization and its users to guard against an external entity impersonating another entity that has and/or maintains a trusted relationship with the organization. By identifying relationships between internal and external domains, these domains may be more accurately and effectively scored, which may result in execution of more effective preventative and/or remedial security measures, and ultimately in enhanced enterprise security. Furthermore, by reducing the number of domains to be analyzed through a security scoring, grading, and ranking process, processing resources and/or other computing resources may be conserved while still ensuring that the highest priority domains are evaluated.

For example, an enterprise organization may have robust message inspection policies, but members of the enterprise organization's supply chain or other third party vendors might not have such robust practices, and accordingly, malicious messages may penetrate the enterprise organization as a result of these third parties. For instance, malicious actors may attack individuals within a supply chain who might not have adequate security measures, gain unauthorized access to the individuals' accounts, and then may use these compromised accounts to attack other organizations who may have more advanced security measures implemented (e.g., through impersonation of the third party). For example, these malicious actors may impersonate others using display name spoofing (e.g., supplier <user@serviceprovider.com>), email alias spoofing (e.g., supplier@serviceprovider.com), subject header spoofing (e.g., "Re: Invoice from Your Supplier"), header domain spoofing, and/or other methods of impersonation. In these situations, one or more aspects of the disclosure may provide various benefits by implementing an additional level of protection against such attacks.

Because of limits on actual and/or available processing power, network bandwidth, and/or other computing resources, it may be difficult to add additional protection to all messages received by all users of an enterprise organization. Instead, and as illustrated in connection with one or more embodiments described in greater detail below, a subset of external and/or sender domains which may require heightened scrutiny and/or stronger protective measures may be identified, and enhanced protection measures may be implemented with regard to these domains accordingly. In doing so, network security and information security may be preserved and ensured while conserving processing resources and/or other computing resources. Furthermore, by reducing the scope of messages to discreet subsets, effective machine learning techniques may be trained for each of the reduced sets of communication flows.

Furthermore, once domains have been identified as requiring heightened scrutiny, it may be advantageous to apply such scrutiny (and/or any related security measures) to other related domains and/or entities. In doing so, a single instance of risk may produce a network effect (enhanced protection measures to be performed across a plurality of related domains/entities), which may result in improved network and information security, and may, in some instances, reduce computing power needed to identify each vulnerability (e.g., identify network effects rather than each compromised domain individually).

FIG. 1 depicts an illustrative operating environment for performing dynamic message analysis and executing enhanced protection actions in accordance with one or more example embodiments. Referring to FIG. 1, computing environment 100 may include various computer systems, computing devices, networks, and/or other operating infrastructure. For example, computing environment 100 may include a message security platform 110, an internal enterprise user device 120, a third party user device 130, an enterprise network gateway system 140, an electronic messaging server 150, an isolation system 160, and a network 190.

Network 190 may include one or more wired networks and/or one or more wireless networks that interconnect message security platform 110, internal enterprise user device 120, third party user device 130, enterprise network gateway system 140, electronic messaging server 150, isolation system 160, and/or other computer systems and/or devices. In addition, each of message security platform 110, internal enterprise user device 120, third party user device 130, enterprise network gateway system 140, electronic messaging server 150, and isolation system 160 may be special purpose computing devices configured to perform specific functions, as illustrated in greater detail below, and may include specific computing components such as processors, memories, communication interfaces, and/or the like.

Message security platform 110 may include one or more processor(s) 111, one or more memory(s) 112, and one or more communication interface(s) 113. In some instances, message security platform 110 may be made up of a plurality of different computing devices, which may be distributed within a single data center or a plurality of different data centers. In these instances, the one or more processor(s) 111, one or more memory(s) 112, and one or more communication interface(s) 113 included in message security platform 110 may be part of and/or otherwise associated with the different computing devices that form message security platform 110.

In one or more arrangements, processor(s) 111 may control operations of message security platform 110. Memory(s) 112 may store instructions that, when executed by processor(s) 111, cause message security platform 110 to perform one or more functions, as discussed below. Communication interface(s) 113 may include one or more wired and/or wireless network interfaces, and communication interface(s) 113 may connect message security platform 110 to one or more networks (e.g., network 190) and/or enable message security platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message security platform 110 to perform various functions) and/or databases (which may, e.g., store data used by message security platform 110 in performing various functions). For example, memory(s) 112 may store and/or otherwise provide relationship identification module 112a, security scoring module 112b, and enhanced protection module 112c. In some instances, relationship identification module 112a may store instructions that cause message security platform 110 to apply one or more manual relationship identification processes (e.g., ERP export, curated lists, and/or other processes), one or more automated relationship identification processes (e.g., heuristics, algorithmic, machine learning, and/or other processes), and/or one or more other functions described herein. Additionally, security scoring module 112b may store data that may be used by message security platform 110 in applying a security scoring process to the identified relationships, computing weighted grades for external domains, and/or in executing one or more other functions described herein. Furthermore, enhanced protection module 112c may store instructions and/or data that may cause and/or be used by message security platform 110 to perform one or more enhanced protection actions (e.g., informative protection actions, active protection actions, automated protection actions, and/or other actions, which may include sending alerts to users, administrators, and/or security information and event management (SIEM) interfaces) and/or execute one or more other functions described herein.

In some instances, in sending these alerts, the message security platform 110 may cause alerts to be sent to other organizations (e.g., different than an organization corresponding to the message security platform 110) that may have a supply chain and/or other relationship with the organization corresponding to the message security platform 110. Similarly, the message security platform 110 may alert end users and/or administers of electronic messages sent from and/or received by domains with corresponding security scores that exceed a predetermined threshold. In some instances, in sending the alerts, the message security platform 110 may push alerts through email and/or other communication mechanisms. Additionally or alternatively, the message security platform 110 may configure the alerts for retrieval via application protocol interfaces (API) and/or other end point retrieval mechanisms at the message security platform 110. In doing so, the message security platform 110 may proactively notify users and/or administrators, while also enabling a mechanism that may be used by such users and/or administrators to retrieve information (e.g., a user may query the message security platform 110 for domain grades using an API).

Internal enterprise user device 120 may be configured to be used by a first user (who may, e.g., be an employee of an enterprise organization). In some instances, internal enterprise user device 120 may be configured to present one or more user interfaces associated with security alerts, reports, enhanced security configurations, guidelines, and/or other content.

Third party user device 130 may be configured to be used by a second user (who may, e.g., be an employee of a third party organization, which may be a vendor to the enterprise organization and/or otherwise be included in a supply chain for the enterprise organization). For example, third party user device 130 may be used by and/or linked to a trusted business partner, vendor, customer, or other entity having a long-term relationship with the enterprise organization. In some instances, third party user device 130 may be configured to present one or more user interfaces associated with security alerts, reports, enhanced security configurations, guidelines, and/or other content.

Enterprise network gateway system 140 may be and/or include one or more computing devices (e.g., servers, server blades, enterprise devices, or the like) that may be configured to enforce and/or otherwise maintain network security policies (e.g., email authentication compliance policies, business email compromise (BEC) protection policies, email account compromise (EAC) policies, and/or other policies) for the enterprise organization. In some instances, the enterprise network gateway system 140 may be configured to receive commands from the message security platform 110 and to update network security policies in response to or based on the commands.

Electronic messaging server 150 may be and/or include one or more computing devices (e.g., servers, server blades, enterprise devices, or the like) that may be configured to host one or more electronic messaging services (e.g., email services). Furthermore, the electronic messaging server 150 may be configured to provide messages for analysis at the message security platform 110.

Isolation system 160 may be configured to host and/or otherwise provide one or more browser mirroring sessions. For instances, isolation system 160 may be configured to host a browser mirroring session in which a browser is executed, so as to provide a user computing device (e.g., internal enterprise user device 120 or third party user device 130) with limited access to an untrusted remotely-hosted site via the browser, as illustrated in greater detail below. In some instances, isolation system 160 may be operated by and/or otherwise associated with an enterprise organization, such as an organization operating message security platform 110.

Figure 2A:
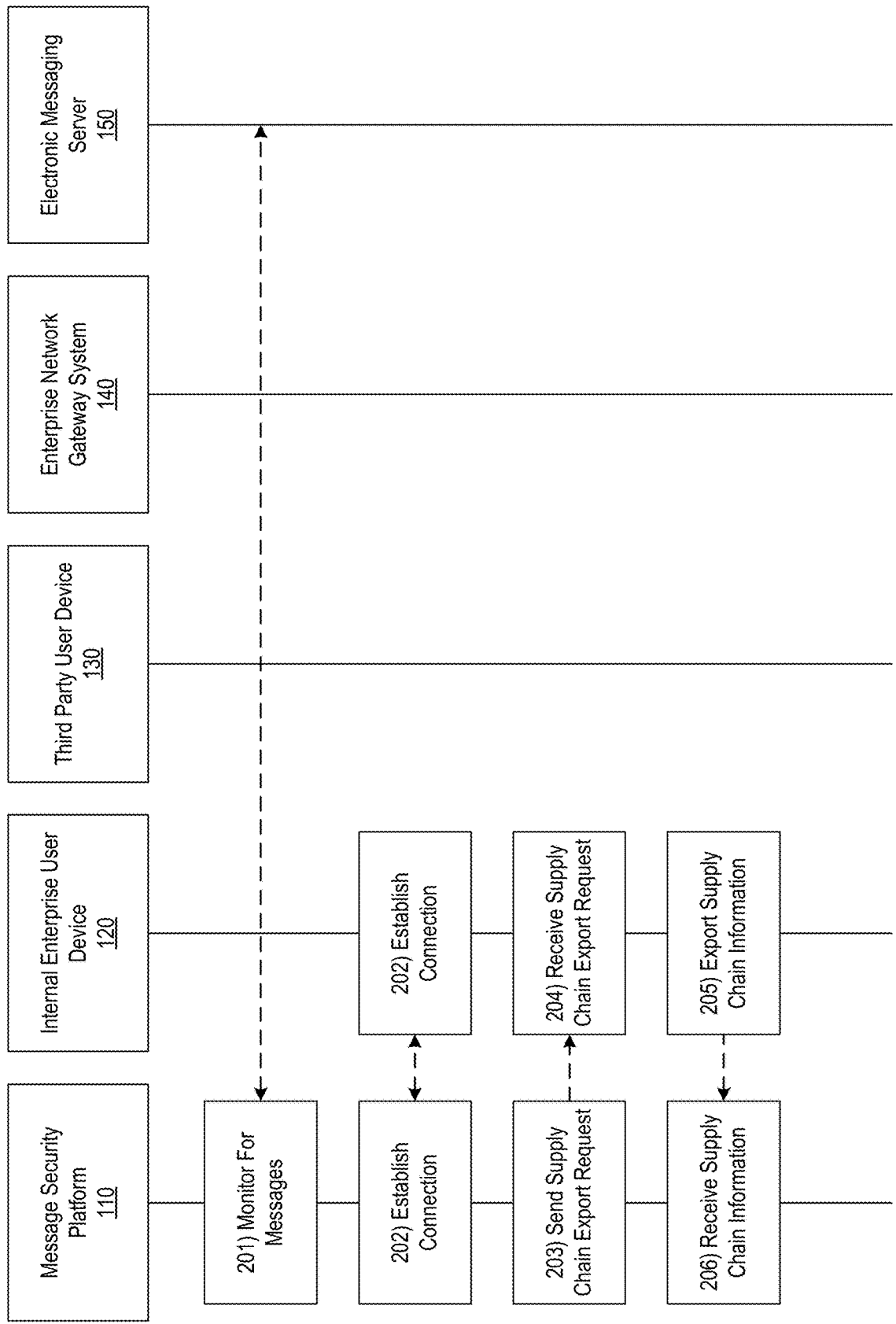
FIGS. 2A-2J depict an illustrative event sequence for performing dynamic message analysis and executing enhanced protection actions in accordance with one or more example embodiments.

FIGS. 2A-2J depict an illustrative event sequence for performing dynamic message analysis and executing enhanced protection actions in accordance with one or more example embodiments. Referring to FIG. 2A, at step 201, message security platform 110 may monitor the electronic messaging server 150 for messages (e.g., new email messages). For example, the message security platform 110 may monitor the electronic messaging server 150 continuously or at a predetermined interval to collect messages between a plurality of message recipient domains and a plurality of message sender domains, which may in some instances correspond to internal domains (e.g., domains that are maintained by and/or otherwise associated with the enterprise organization) and external domains (e.g., domains that are maintained by and/or otherwise associated with an organization different from the enterprise organization), respectively.

Once messages have been received at the message security platform 110, the message security platform may initiate a manual and/or automated process to identify relationships between message senders and recipients (e.g., as described below with regard to steps 202-210).

For example, with regard to the manual identification process, at step 202, the message security platform 110 may establish a connection with internal enterprise user device 120. For example, the message security platform 110 may establish a first data connection with internal enterprise user device 120 to link the message security platform 110 to the internal enterprise user device 120 (e.g., in preparation for requesting supply chain information). In some instances, the message security platform 110 may identify whether or not a connection is already established with the internal enterprise user device 120. If a connection is already established with the internal enterprise user device 120, the message security platform 110 might not re-establish the connection. If a connection is not yet established with the internal enterprise user device 120, the message security platform 110 may establish the first data connection as described herein.

At step 203, the message security platform 110 may generate and send, share, or otherwise provide a request to the internal enterprise user device 120 for supply chain information. For example, in requesting supply chain information, the message security platform 110 may request data indicating organizations with which an organization, corresponding to the internal enterprise user device 120, is doing business (e.g., email domains, email addresses, publicly available data corresponding to interactions with these organizations and/or non-public data corresponding to interactions with these organizations). In doing so, the message security platform 110 may request a plurality of different types of information from various sources, which may be used to inform domain grading/scoring.

In some instances, in generating and/or sending such a request, the message security platform 110 may generate and send a request to export relationship data associated with one or more relationships between the plurality of message sender domains and the plurality of message recipient domains (which may, e.g., be indicative of vendors and/or other companies in an organization's supply chain). In some instances, the message security platform 110 may send the request for supply chain information to the internal enterprise user device 120 via the communication interface 113 and while the first data connection is established.

At step 204, the internal enterprise user device 120 may receive or otherwise access the request for supply chain information sent at step 203. For example, the internal enterprise user device 120 may receive the request for supply chain information while the first data connection is established.

At step 205, the internal enterprise user device 120 may identify and send, share, or otherwise provide supply chain information to the message security platform 110. In some instances, in sending the supply chain information to the message security platform 110, the internal enterprise user device 120 may send information identifying the one or more relationships between the plurality of message sender domains and the plurality of message recipient domains. In some instances, in sending the supply chain information to the message security platform 110, the internal enterprise user device 120 may send one or more enterprise resource planning (ERP) export files, one or more curated lists, or the like, which may, in some instances, be based on user input received at the internal enterprise user device 120 from a user of the internal enterprise user device 120 (who may, e.g., be referred to as a first user). Additionally or alternatively, the internal enterprise user device 120 may present one or more graphical user interfaces that may enable a user to search for and/or select an organization by name and identify all known sending domains corresponding to the organization (which may, in some instances, include receiving input classifying a relationship type). In these instances, in sending the supply chain information, the internal enterprise user device 120 may send information received via the one or more graphical user interfaces. In some instances, the internal enterprise user device 120 may send the supply chain information to the message security platform 110 while the first data connection is established.

At step 206, the message security platform 110 may receive or otherwise access the supply chain information sent at step 205. In some instances, the message security platform 110 may receive the supply chain information via the communication interface 113 and while the first data connection is established.

Figure 2B:
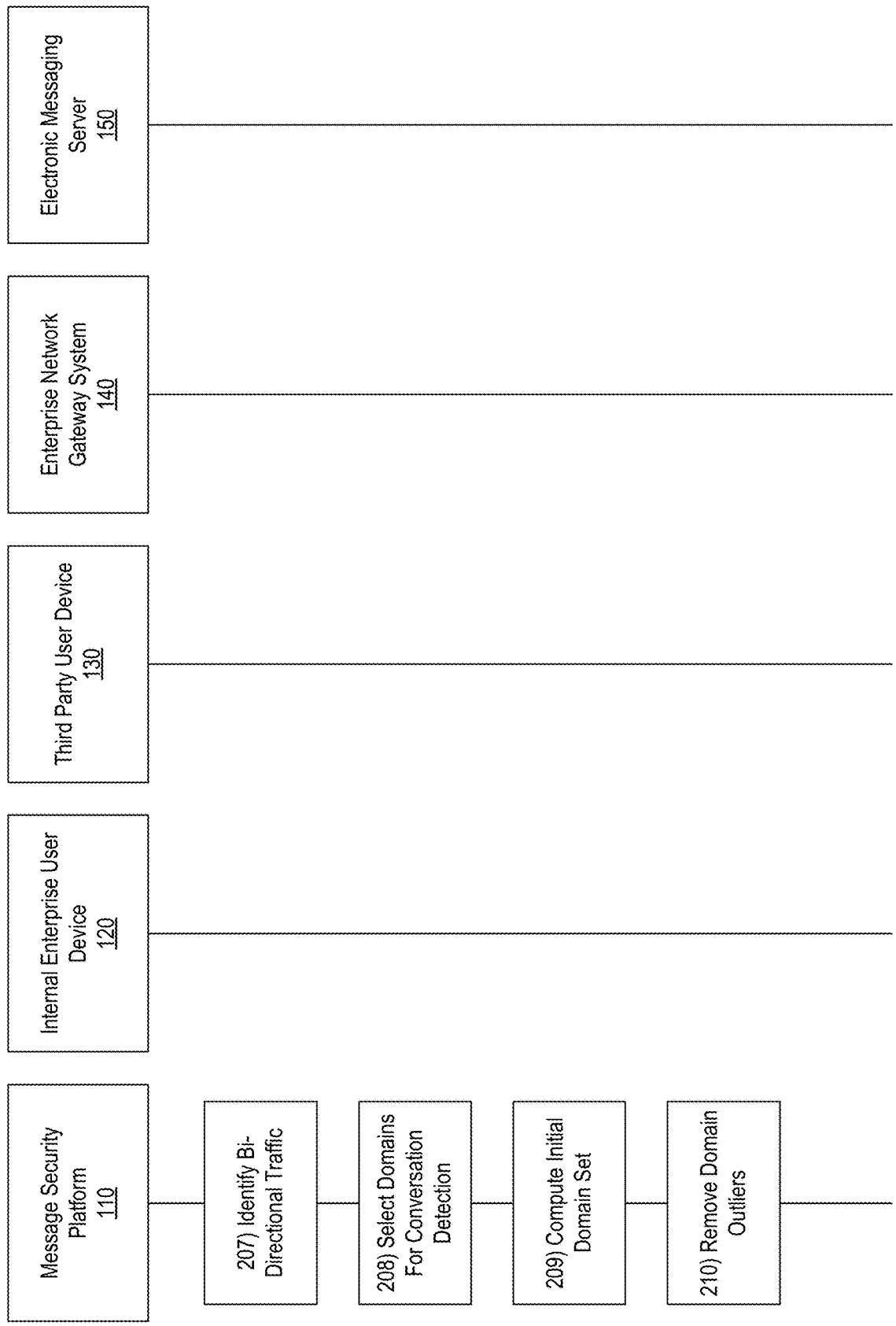

Referring to FIG. 2B, in some instances, in addition or as an alternative to the manual relationship identification process described above at steps 202-206, the message security platform 110 may identify relationships between the plurality of message senders and the plurality of message recipients using one or more automated methods. For example, at step 207, the message security platform 110 may identify, based on the messages at the electronic messaging server 150, domains associated with bi-directional message traffic (e.g., domain pairs where each domain of the pair both sends messages to and receives messages from the other, which may, in some instances, include an internal domain and an external domain).

At step 208, the message security platform 110 may select, from the domains identified at step 207, a plurality of external domains (e.g., message sender domains) for a conversation detection process. For example, the message security platform 110 may select the external domains associated with the bi-directional message traffic identified at step 207 for a conversation detection process.

At step 209, the message security platform 110 may compute an initial set of rank-ordered external domains based on the external domains selected at step 208. For example, for each external domain selected at step 208, the message security platform 110 may identify a first number of messages sent from one or more (internal) enterprise domains to the external domain and a second number of messages received at the one or more enterprise domains from the external domain. In some instances, the computing platform may identify the first number of messages sent from the one or more enterprise domains to the external domain and the second number of messages received at the one or more enterprise domains from the external domain concurrently (e.g., at substantially the same time). After identifying the first number of messages and the second number of messages, the message security platform 110 may compute a first ratio of the first number of messages divided by the second number of messages and a second ratio of the second number of messages divided by the first number of messages. After computing the first ratio and the second ratio, the message security platform 110 may identify a difference between the first ratio and the second ratio, and may apply a weight value to the difference based on a quantity of messages corresponding to the first number of messages and the second number of messages, which may result in a weighted difference value for the external domain (e.g., if the first number of messages and the second number of messages exceed a predetermined threshold, the external domain may correspond to a member of the supply chain that is frequently contacted or otherwise dealt with, and thus the difference value may be weighted higher than if the first number of messages and the second number of messages do not exceed the predetermined threshold). After completing this weighted difference value computation for each of the external domains selected at step 208, the message security platform 110 may rank the external domains selected for the conversation detection process based on their corresponding weighted difference values.

Accordingly, in computing the initial set of rank-ordered external domains, the message security platform 110 may apply the function $$f_d(a, b) = \frac{\left(\frac{a}{b}\right) - \left(\frac{b}{a}\right)}{f_v},$$

where a is the count of email sent by a customer to a specific domain, b is the count of email the customer received from the specific domain, and $f_v$ is a weighting value based on volume and risk (e.g., $f_v(a,b)=ab^2$). Without a weighted process, the message security platform 110 may generate highly balanced ratios for various external domains, which may inadvertently overvalue small conversations. For example, ratios for external domains sending five messages a month may be the same as ratios for external domains sending a million messages a month. Accordingly, the message security platform 110 may address this problem by weighting the ratios based on volume of messages exchanged.

At step 210, the message security platform 110 may remove, from the initial set of rank-ordered external domains, a set of one or more known outlier domains, which may result in a final set of rank-ordered external domains.

For example, the message security platform 110 may output a set $S_2$ of rank-ordered domains, where $S_2=S_1-K$, and where K is a set of known outliers that includes domains known (e.g., to a high degree of confidence) not to be trusted suppliers (e.g., consumer mailbox providers, or the like).

In addition or as an alternative to the automated algorithmic identification process described above at steps 207-210, the message security platform 110 may identify relationships between domains using one or more heuristics (which may, e.g., apply various rules to domains and/or emails sent or received between different domains, such as a rule applying to messages sent only between 9 AM and 5 PM, or the like). Additionally or alternatively, the message security platform 110 may identify relationships through inspection of domain name system (DNS) records (e.g., dereferencing internet protocol (IP) addresses declared within Sender Policy Framework (SPF) records, Mail Exchange (MX) record delegation, and/or authority claim tokens published within DNS). Additionally or alternatively, the message security platform 110 may identify relationships between domains using machine learning techniques (e.g., Fisher Kernels, Hidden Markov Models (HMM), clustering/support vector machine (SVM) by customer, industry, organization, and/or other groupings), natural language processing techniques (information extraction), domain identification methods (e.g., to identify potential relationship impersonations instead of or in addition to genuine relationships between domains), inference based on common industry data (e.g., domains that operate within the same industry may share similar suppliers), or the like. In some instances, these automated identification processes may provide additional value by detecting shadow information technology (IT) services. For example, organizations might not always know whom they are doing business with (e.g., they could be using free services, expensing charges to corporate credit cards). In some instances, for previously identified domains, the message security platform 110 may roll up sub-domains, company names, or the like (e.g., using a domain database). In some instances, the actions described at step 210 may occur prior to the bi-directional weighting process described above at step 209, and this alternative arrangement may provide technical advantages in the form of reduced usage of computational resources.

Figure 2C:
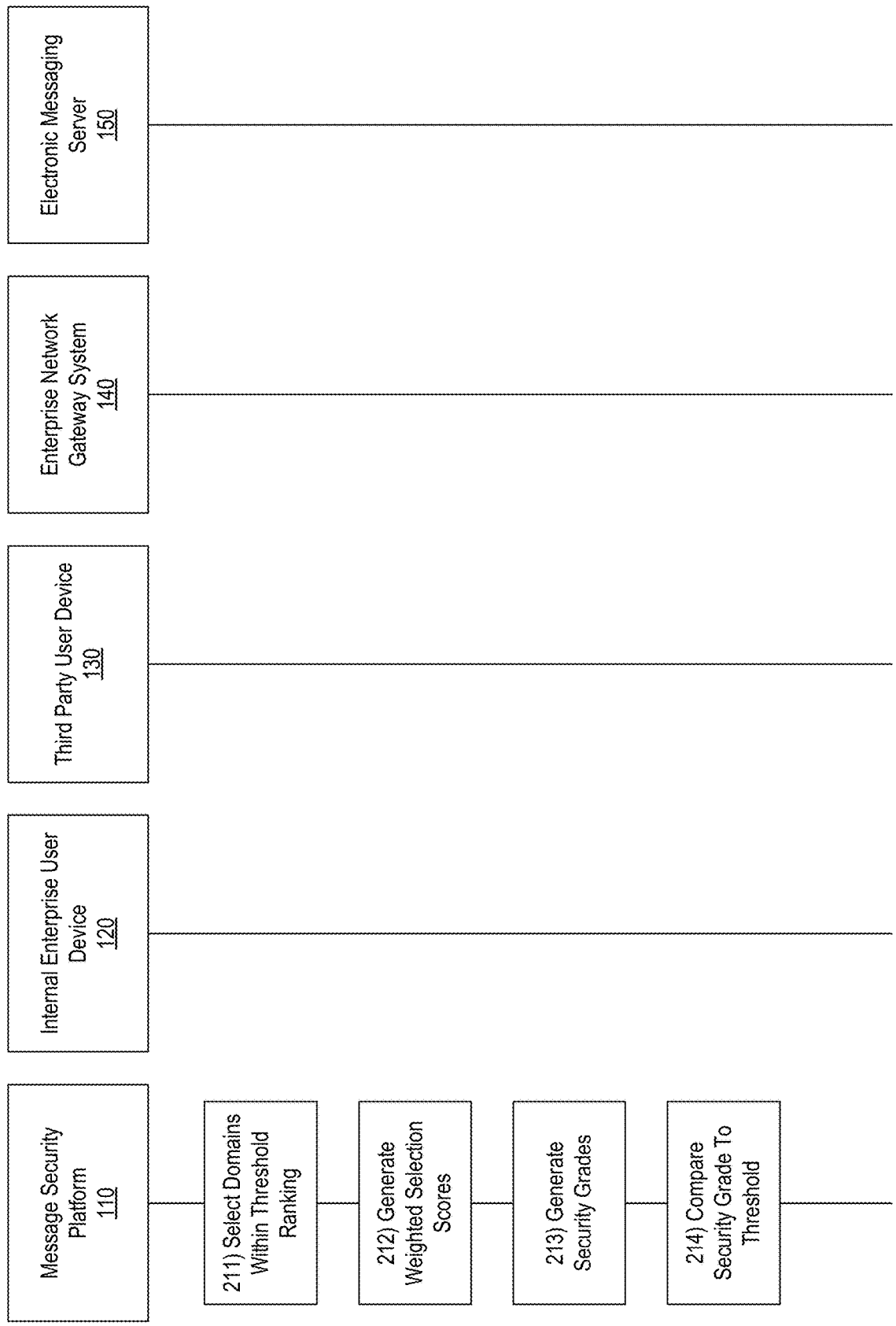

Referring to FIG. 2C, at step 211, the message security platform 110 may select domains from the final set of rank ordered domains, computed at step 210, within a threshold ranking value. For example, the message security platform 110 may select the top five domains, top ten domains, or the like. In doing so, the message security platform 110 may reduce processing strain on the message security platform 110 in performing the security scoring process described below (e.g., less processing power may be needed to analyze a smaller number of domains). Furthermore, by reducing the scope of the domains to be analyzed, certain machine learning techniques may be used and/or facilitated by eliminating noise.

At step 212, the message security platform 110 may apply a security scoring process by generating weighted selection scores for the external domains selected at step 211. For example, the message security platform 110 may evaluate these external domains, using business logic, heuristics, machine learning techniques, and/or other methods, based on a security posture, historical threat information, trust metrics, reputation data, external data (e.g., external feeds/ratings), email metadata, email content, domain metadata, and/or other factors, which may, e.g., each be weighted the same or differently in the application of the security scoring process. For example, the message security platform 110 may analyze publicly discovered signals corresponding to the external domains (e.g., by ensuring that a SPF configuration is compliant with the specification published by the Internet Engineering Task Force (IETF) and industry best practices, analyzing a DMARC record, and/or analyzing transport layer security (TLS) details). Additionally or alternatively, the message security platform 110 may analyze external data from other scoring entities and/or internal message level scores (which may, e.g., whether this domain has been observed being abused in another context) to identify vulnerabilities in the external domains. In some instances, the message security platform 110 may identify domain impersonation (e.g., display name spoofing, email alias spoofing, subject header spoofing, header domain spoofing, look-alike domains, and/or other types of impersonation). In some instances, the message security platform 110 may identify such domain impersonation based on domain registration details, email authentication failure reports, safe lists/blocklists, certificate transparency (CT) logs, heuristics, machine learning techniques, and/or other methods.

In doing so, the message security platform 110 may compute one or more domain scores (e.g., corresponding to the respective domains), one or more sender scores (e.g., corresponding to the respective senders of the messages), and/or one or more message scores (e.g., corresponding to specific messages originating from the respective domains) for each external domain. In computing these scores, the message security platform 110 may factor in both information indicating that a domain is impersonated and/or otherwise compromised (e.g., email account compromised, machine compromised, internal threats, domain maintained by a bad actor, failing grade issued by other security companies, and/or otherwise compromised). In some instances, the message security platform 110 may weight the information indicating that a domain is impersonated differently or the same as information indicating that the domain is otherwise compromised, and may, in some instances, tune these weights over time using heuristics, machine learning, and/or other techniques. In some instances, the message security platform 110 may compute a matrix of scores that includes the one or more domain scores, one or more sender scores, and/or one or more message scores.

In some instances, the message security platform 110 may combine scores for multiple domains when a relationship between the domains has been identified (e.g., using a method such as an algorithm to identify the relationship and/or using information provided manually and/or data from external sources). Additionally or alternatively, the message security platform 110 may attribute domain scores and/or combine scores for multiple domains as belonging to and/or being operated by and/or on behalf of a specific organization such that an aggregate score may be assigned to and/or associated with that organization.

In some instances, these scores may be composite scores that represent levels of threat, vulnerability, and/or consequences for the corresponding domains. Additionally or alternatively, these scores may be representative, not only of a sender of a particular domain, but also of a specific corresponding customer/sender relationship.

In some instances, the message security platform 110 may score domains based on manual identification information and/or data received from other internal and/or external data feeds. For example, in some instances, customers may have specific knowledge of supply chain relationships that may be contributed to the message security platform 110.

At step 213, the message security platform 110 may compute a weighted grade (e.g., a numeric grade, a letter grade, etc.) for each external domain. For example, the message security platform 110 may use the one or more domain scores, the one or more sender scores, the one or more message scores, and/or external data received from other sources as inputs into a scoring algorithm that may calculate the weighted grades for each of the external domains. In doing so, the message security platform 110 may, for instance, add the one or more domain scores, the one or more sender scores, and the one or more message scores together and apply a weighting value. In some instances, in computing the weighted grade, the message security platform 110 may effectively generate a representation of how well a third party organization corresponding to the given external domain is performing in terms of deploying their own security measures (which may, e.g., be used to inform how to proceed so as to increase protection of the enterprise organization with respect to companies in its supply chain). After determining the weighted grades for the external domains, the message security platform 110 may execute one or more enhanced protection actions (e.g., informative protection actions, active protection actions, automated protection actions, sending warning alerts, and/or other actions) based on the weighted grades, as discussed in greater detail below.

For example, at step 214, the message security platform 110 may compare the weighted grades to a first enhanced protection threshold. If the message security platform 110 determines that a weighted grade does not exceed the first enhanced protection threshold, the message security platform 110 may proceed to step 215 with regard to the corresponding external domain to perform one or more informative protection actions. If the message security platform 110 determines that a weighted grade does exceed the first enhanced protection threshold, the message security platform 110 may proceed to step 228 with regard to the corresponding external domain. In some instances, the message security platform 110 may dynamically adjust the first enhanced protection threshold over time, using one or more machine learning algorithms and/or based on a user input, so as to maintain a predetermined rate of weighted grades that exceed the first enhanced protection threshold.

Figure 2D:
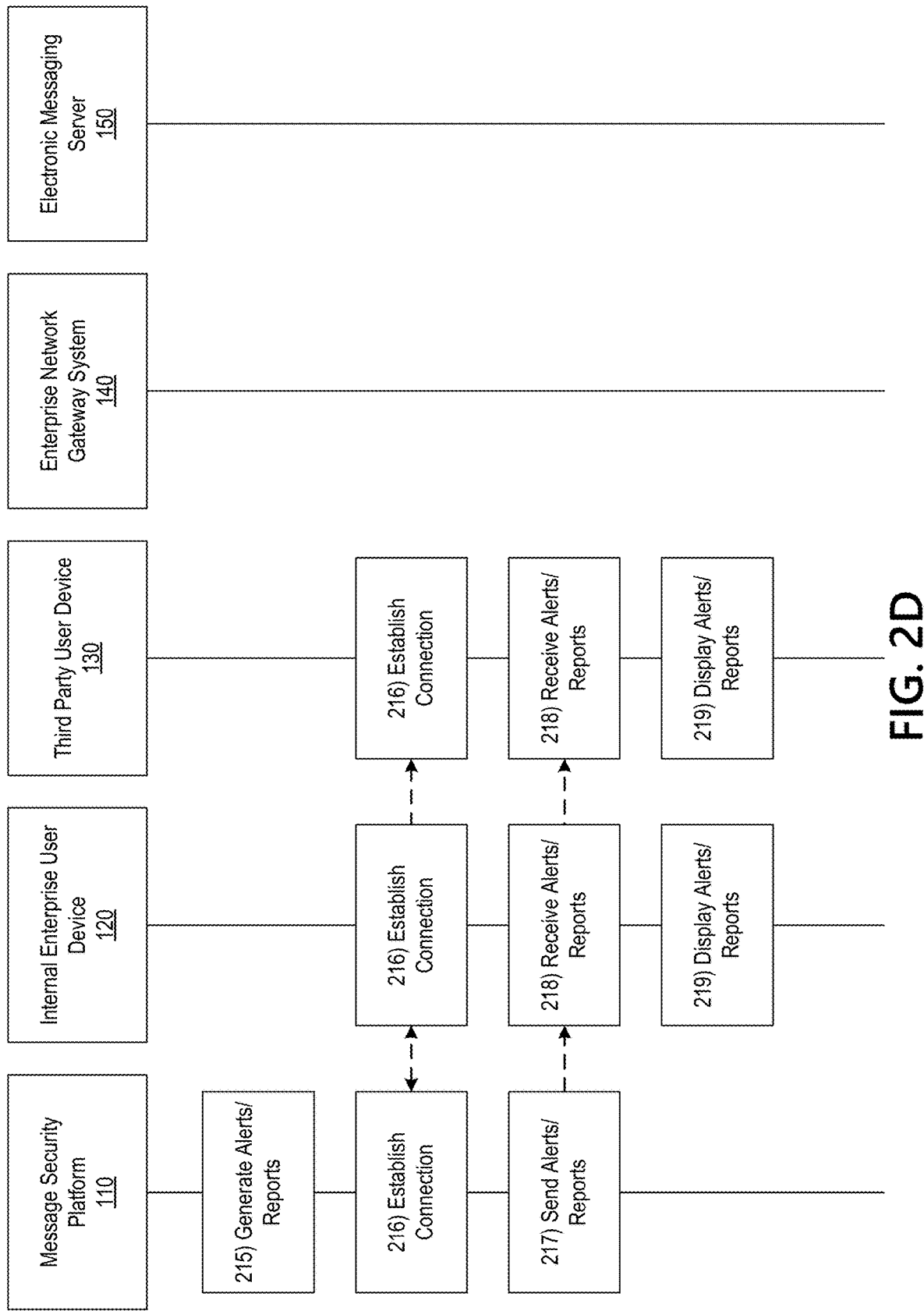

Referring to FIG. 2D, at step 215, based on the determination at step 214 that a weighted grade does not exceed the first enhanced protection threshold, the message security platform 110 may generate one or more reports or alerts corresponding to the external domain. For example, the message security platform 110 may generate one or more reports or alerts that contain information identifying the external domain and an indication of a security threat.

At step 216, the message security platform 110 may establish connections with the internal enterprise user device 120 and/or the third party user device 130. For example, the message security platform 110 may establish first and/or second data connections with the internal enterprise user device 120 and/or the third party user device 130 to link the message security platform 110 to the internal enterprise user device 120 and/or the third party user device 130 (e.g., in preparation for sending one or more reports, alerts, and/or other messages). In some instances, the message security platform 110 may identify whether or not connections are already established with the internal enterprise user device 120 and/or the third party user device 130. If connections are already established with the internal enterprise user device 120 and/or the third party user device 130, the message security platform 110 might not re-establish these connections. If connections are not yet established with the internal enterprise user device 120 and/or the third party user device 130, the message security platform 110 may establish the second and third data connections as described herein.

At step 217, the message security platform 110 may send, share, or otherwise provide the reports, alerts, and/or other messages generated at step 215 to the internal enterprise user device 120 and/or the third party user device 130 (which may e.g., correspond to end users and/or administrators of email sent from or received from compromised domains). For example, the message security platform 110 may send the reports, alerts, and/or other messages to the internal enterprise user device 120 and/or the third party user device 130 via the communication interface 113 and while the second and/or third wireless data connections are established. In some instances, in sending the alerts, the message security platform 110 may push the alerts via email and/or other communication mechanisms. Additionally or alternatively, the message security platform 110 may enable the alerts to be pulled by the internal enterprise user device 120 and/or third party user device 130 using application protocol interfaces and/or other end point retrieval mechanisms.

At step 218, the internal enterprise user device 120 may receive or otherwise access the reports, alerts, and/or other messages sent at step 217. In some instances, the internal enterprise user device 120 may receive the reports, alerts, and/or other messages while the second and/or third data connections are established.

Figure 3:
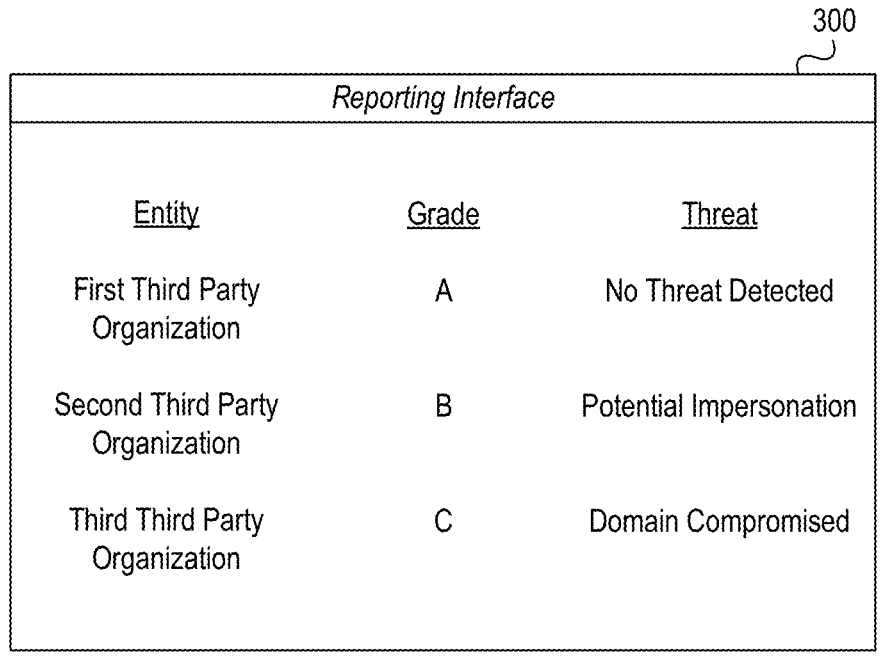
FIGS. 3-7 depict illustrative user interfaces for performing dynamic message analysis and executing enhanced protection actions in accordance with one or more example embodiments.

At step 219, the internal enterprise user device 120 and/or the third party user device 130 may display the reports, alerts, and/or other messages. For example, in displaying the reports, alerts, and/or other messages, the internal enterprise user device 120 and/or the third party user device 130 may display a graphical user interface similar to graphical user interface 300, which is shown in FIG. 3. For example, in displaying such a user interface, the internal enterprise user device 120 may display a file listing members of the organization's supply chain, corresponding weighted grades, and corresponding threats. Additionally or alternatively, in displaying such a user interface, the internal enterprise user device 120 and/or the third party user device 130 may display an indication that a possible threat has been identified related to "Third Party Organization."

Figure 2E:
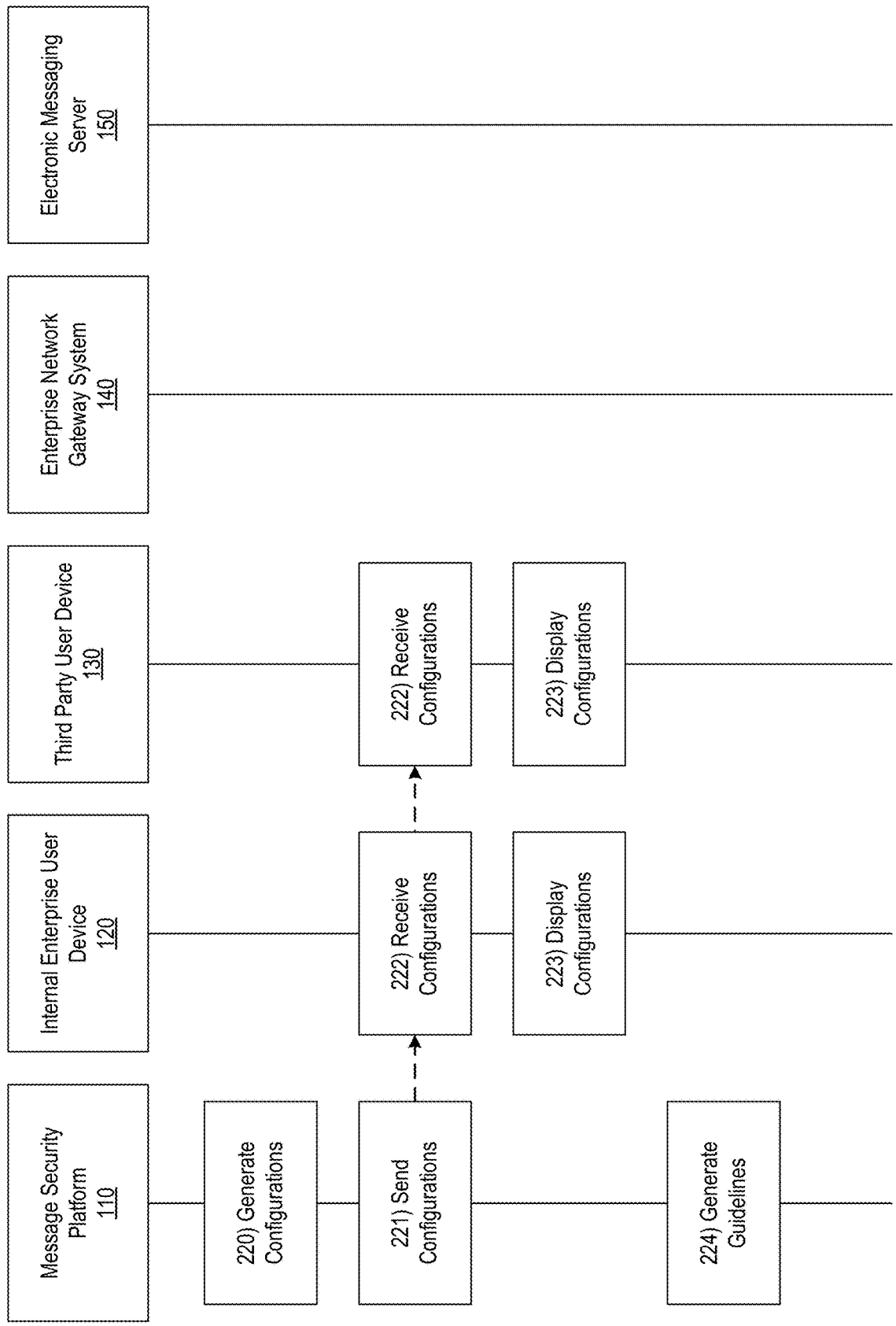

Referring to FIG. 2E, at step 220, based on the determination at step 214 that a weighted score did not exceed the first enhanced protection threshold, the message security platform 110 may generate configuration information based on the corresponding external domain. For example, the message security platform 110 may generate information indicating suggested configuration settings for an email gateway to mitigate or avoid future issues (e.g., based on current settings and/or messages received and/or analyzed by the message security platform 110).

At step 221, the message security platform 110 may send, share, or otherwise provide configuration information to the internal enterprise user device 120 and/or the third party user device 130. For example, the message security platform 110 may send configuration information to the internal enterprise user device 120 and/or the third party user device 130 while the second and/or third data connections are established.

At step 222, the internal enterprise user device 120 and/or the third party user device 130 may receive or otherwise access the configuration information sent at step 221. For example, the internal enterprise user device 120 and/or the third party user device 130 may receive the configuration information while the second and/or third data connections are established.

Figure 4:
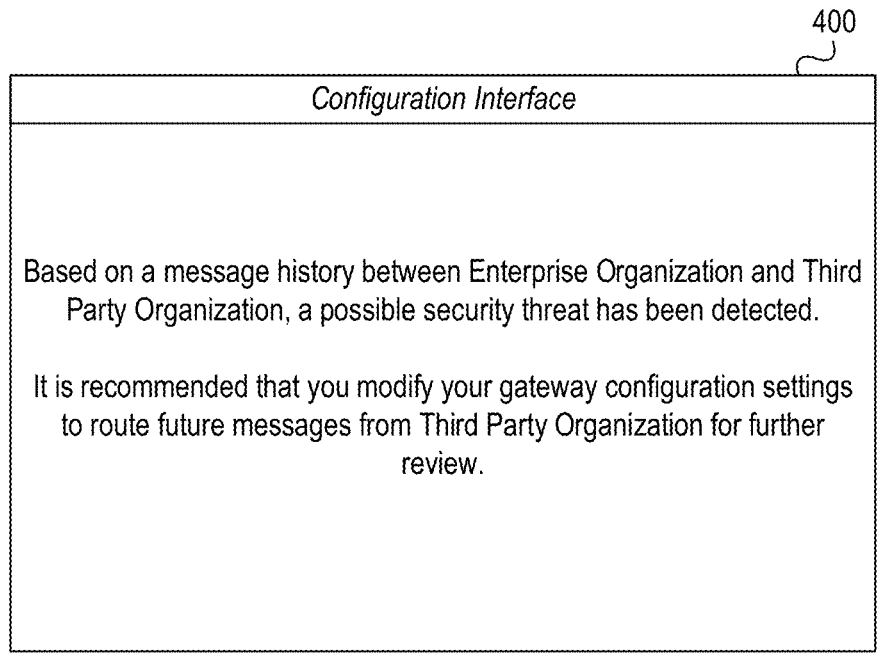

At step 223, the internal enterprise user device 120 and/or the third party user device 130 may display a configuration interface based on the configuration information received at step 222. For example, the internal enterprise user device 120 and/or the third party user device 130 may display a graphical user interface similar to graphical user interface 400, which is shown in FIG. 4. For instance, in displaying such a user interface, the internal enterprise user device 120 and/or the third party user device 130 may display a recommended configuration change based on a detected threat corresponding to the external domain. In some instances, the generation and display of the configuration interface described above at steps 220-223 may be performed in addition to or instead of the generation and/or display of the reports, alerts, and/or other messages described above at steps 215-219.

At step 224, based on the determination at step 214 that a weighted score did not exceed the first enhanced protection threshold, the message security platform 110 may generate guideline information based on the corresponding external domain. For example, in generating such guideline information, the message security platform 110 may generate general and/or specific mitigation guidelines (which may, e.g., include information suggesting how to adjust system configuration settings based on the configuration information generated at step 220). In some instances, in generating the guideline information, the message security platform 110 may generate information directing administrators to configure systems that might not be directly addressable by the message security platform 110, and may instead be addressable using a tool from a third party vendor.

Figure 2F:
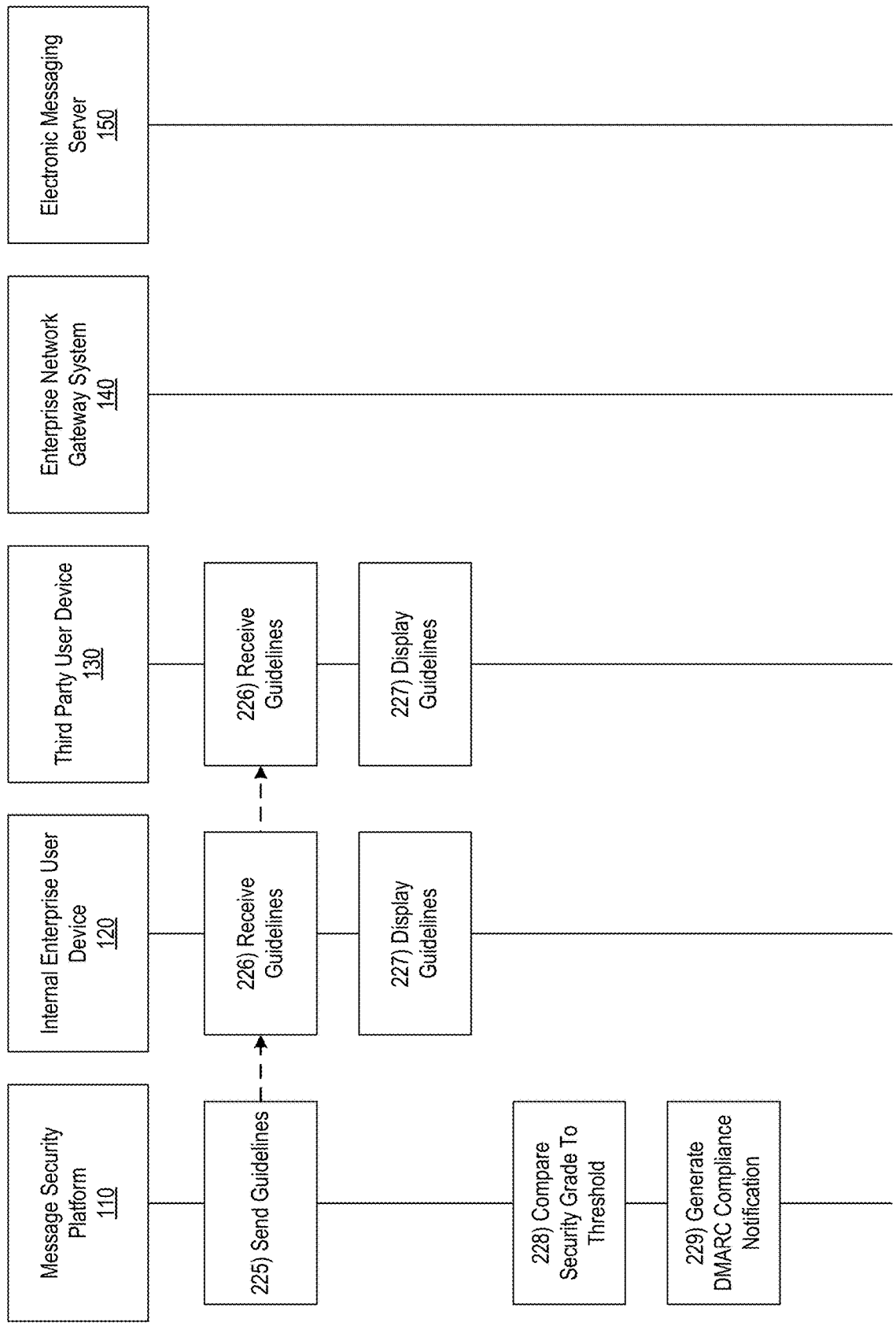

Referring to FIG. 2F, at step 225, the message security platform 110 may send, share, or otherwise provide the guideline information to the internal enterprise user device 120 and/or the third party user device 130. For example, the message security platform 110 may send the guideline information to the internal enterprise user device 120 and/or the third party user device 130 via the communication interface and while the second and/or third data connections are established.

At step 226, the internal enterprise user device 120 and/or the third party user device 130 may receive or otherwise access the guideline information sent at step 225. For example, the internal enterprise user device 120 and/or third party user device 130 may receive the guideline information while the second and/or third data connections are established.

Figure 5:
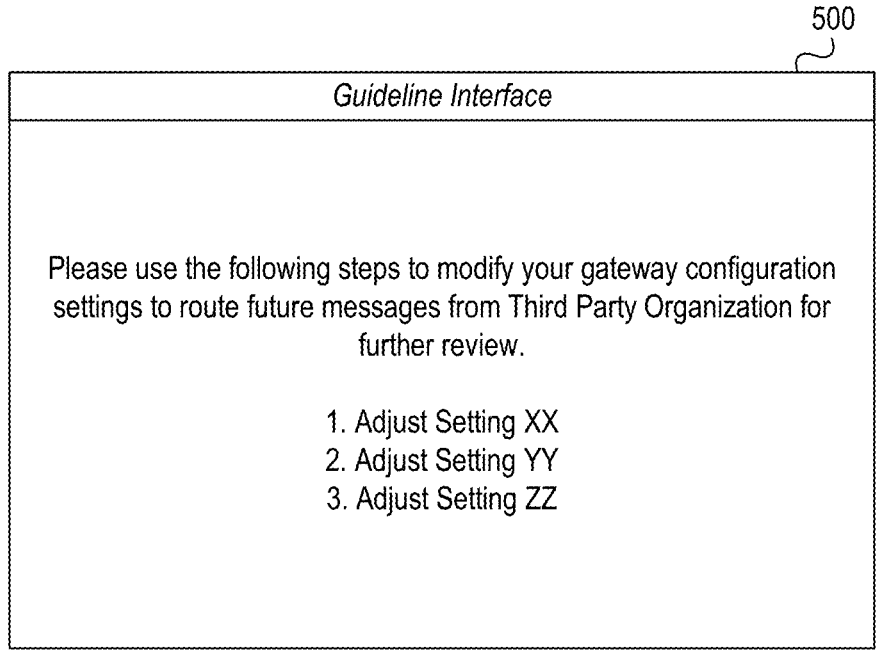

At step 227, the internal enterprise user device 120 and/or the third party user device 130 may display a guideline interface based on the guideline information received at step 226. For example, the internal enterprise user device 120 and/or the third party user device 130 may display a guideline interface similar to graphical user interface 500, which is shown in FIG. 5. For instance, in displaying such a user interface, the internal enterprise user device 120 and/or the third party user device 130 may display guidelines for changing configuration settings. Additionally or alternatively, in displaying such a user interface, the internal enterprise user device 120 and/or the third party user device 130 may display an indication of what a third party vendor corresponding to the external domain should fix and/or otherwise adjust on their own systems. Additionally or alternatively, in displaying such a user interface, the internal enterprise user device 120 and/or the third party user device 130 may display an indication of proposed contract modifications with the third party vendor corresponding to the external domain. In some instances, the guideline interface generation and display described at steps 224-227 may be performed in addition or as an alternative to generation and/or display of the reports, alerts, and/or other messages in steps 215-219 and/or the generation and/or display of the configurations in steps 220-223.

At step 228, in addition or as an alternative to the informative protection actions described in steps 215-227, if the message security platform 110 previously determined that a weighted grade exceeded the first enhanced protection threshold at step 214, the message security platform 110 may compare that weighted grade to a second enhanced protection threshold to identify whether active protection actions or automated protection actions should be performed.

If the message security platform 110 determines that a weighted grade does not exceed the second enhanced protection threshold enhanced protection threshold, the message security platform 110 may proceed to step 229 with regard to the corresponding external domain to perform one or more active protection actions. If the message security platform 110 determines that a weighted grade does exceed the second enhanced protection threshold, the message security platform 110 may proceed to step 242 with regard to the corresponding external domain to perform one or more automated protection actions. In some instances, the message security platform 110 may dynamically adjust the second enhanced protection threshold using one or more machine learning algorithms and/or based on a user input to maintain a predetermined rate of weighted grades that exceed the second enhanced protection threshold.

At step 229, based on the determination that a weighted grade does not exceed the second enhanced protection threshold, the message security platform 110 may generate one or more commands, messages, and/or notifications that may direct or otherwise cause the enterprise organization to employ stronger authentication requirements and/or security policies for email from the external domain (e.g., such as SPF, DKIM, DMARC, TLS enforcement, or other automated and/or manually configured trust and/or reputation metrics). For example, the message security platform 110 may generate the one or more email authentication compliance commands, messages, and/or notifications based on the determination that the weighted grade did not exceed the second enhanced protection threshold at step 228.

Figure 2G:
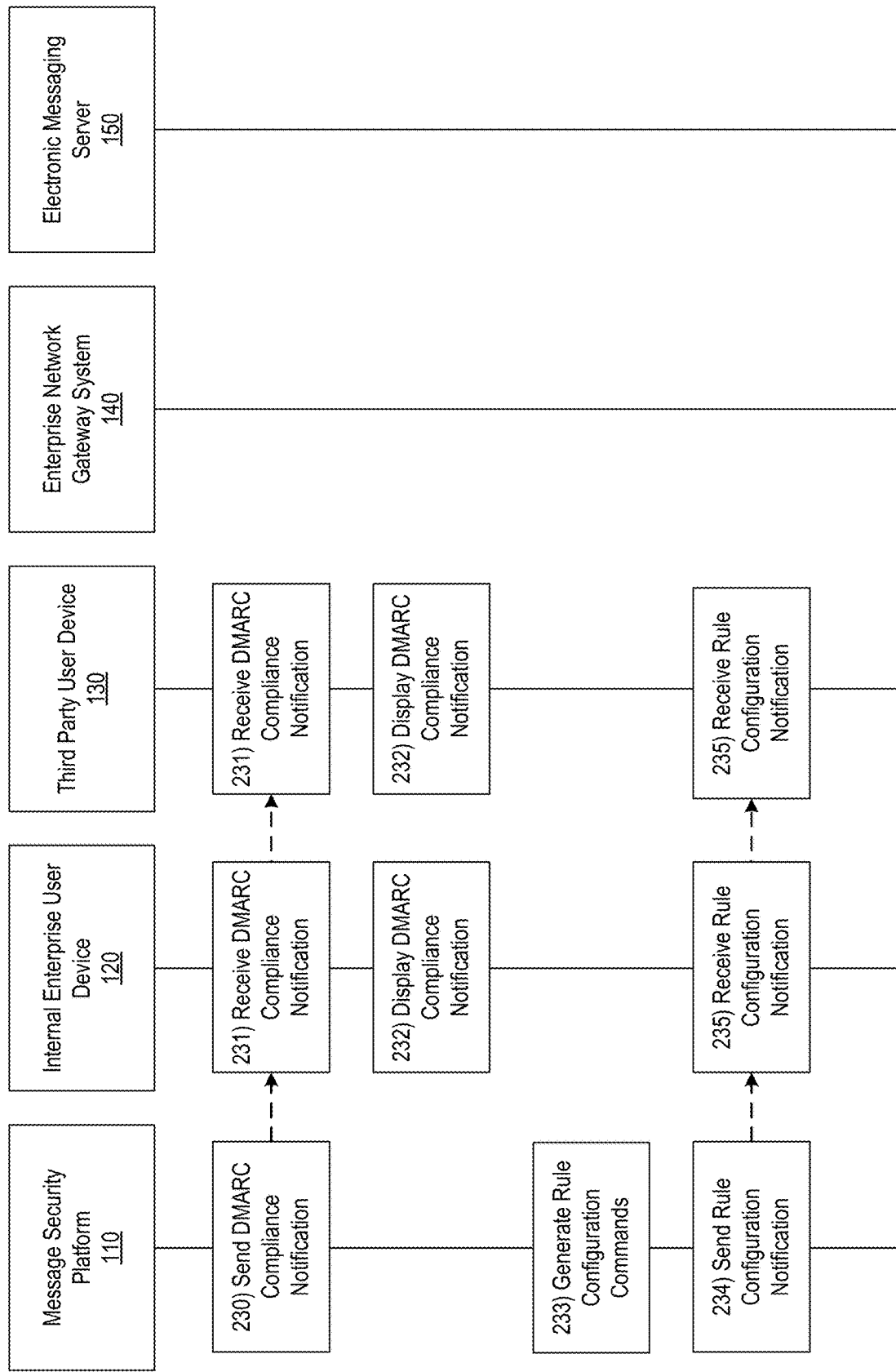

Referring to FIG. 2G, at step 230, the message security platform 110 may send, share, or otherwise provide the one or more email authentication verification commands, messages, and/or notifications to the internal enterprise user device 120 and/or the third party user device 130 (e.g., to enforce compliance with SPF, DKIM, DMARC, TLS, or other automated and/or manually configured trust and/or reputation metrics). For example, the message security platform 110 may send the one or more email authentication compliance commands, messages, and/or notifications to the internal enterprise user device 120 and/or the third party user device 130 via the communication interface 113 and while the second and/or third data connections are established.

At step 231, the internal enterprise user device 120 and/or third party user device 130 may receive or otherwise access the one or more email authentication verification commands, messages, and/or notifications (e.g., the one or more DMARC compliance commands, messages, and/or notifications) from the message security platform 110. For example, the internal enterprise user device 120 and/or third party user device 130 may receive the one or more email authentication compliance commands, messages, and/or notifications while the second and/or third data connections are established.

Figure 6:
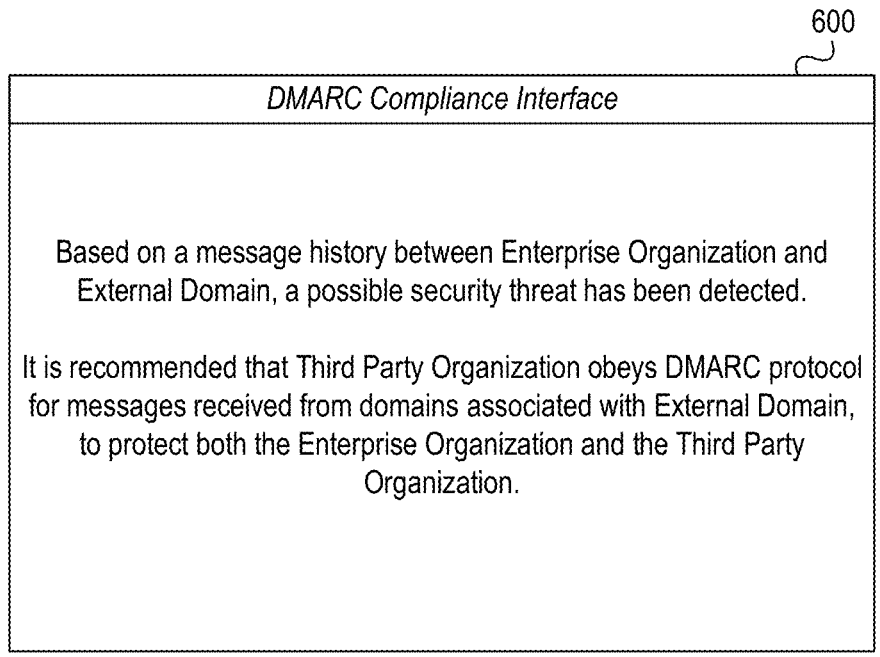

At step 232, the internal enterprise user device 120 and/or third party user device 130 may display the one or more email authentication verification commands, messages, and/or notifications (e.g., the one or more DMARC compliance commands, messages, and/or notifications) received at step 231. For example, the internal enterprise user device 120 and/or third party user device 130 may display a graphical user interface similar to graphical user interface 600, which is shown in FIG. 6. In displaying such a user interface, the internal enterprise user device 120 and/or third party user device 130 may, for instance, display an indication that the enterprise organization and/or the third party organization (e.g., the vendor in the supply chain of the enterprise organization) should enforce inbound email authentication verification (e.g., such as SPF, DKIM, DMARC, or other automated and/or manually configured trust and/or reputation metrics) for messages from the external domain.

At step 233, based on the determination that the weighted grade does not exceed the second enhanced protection threshold, the message security platform 110 may generate one or more rule configuration commands. For example, the message security platform 110 may generate one or more commands, messages, and/or notifications directing a user (e.g., of an internal or external enterprise user device) to update a security configuration of the enterprise network gateway system 140. Additionally or alternatively, the message security platform 110 may generate one or more commands directing internal enterprise user device 120 itself to configure messages from specified external entities to include an informational banner warning the recipient to be vigilant when interacting with the message.

At step 234, the message security platform 110 may send, share, or otherwise provide the one or more rule configuration commands to the internal enterprise user device 120 and/or third party user device 130. For example, the message security platform 110 may send the one or more rule configuration commands to the internal enterprise user device 120 and/or third party user device 130 via the communication interface 113 and while the second and/or third data connections are established.

At step 235, the internal enterprise user device 120 and/or third party user device 130 may receive the one or more rule configuration commands from the message security platform 110. For example, the internal enterprise user device 120 and/or third party user device 130 may receive the one or more rule configuration commands from the message security platform 110 while the second and/or third data connections are established.

Figure 2H:
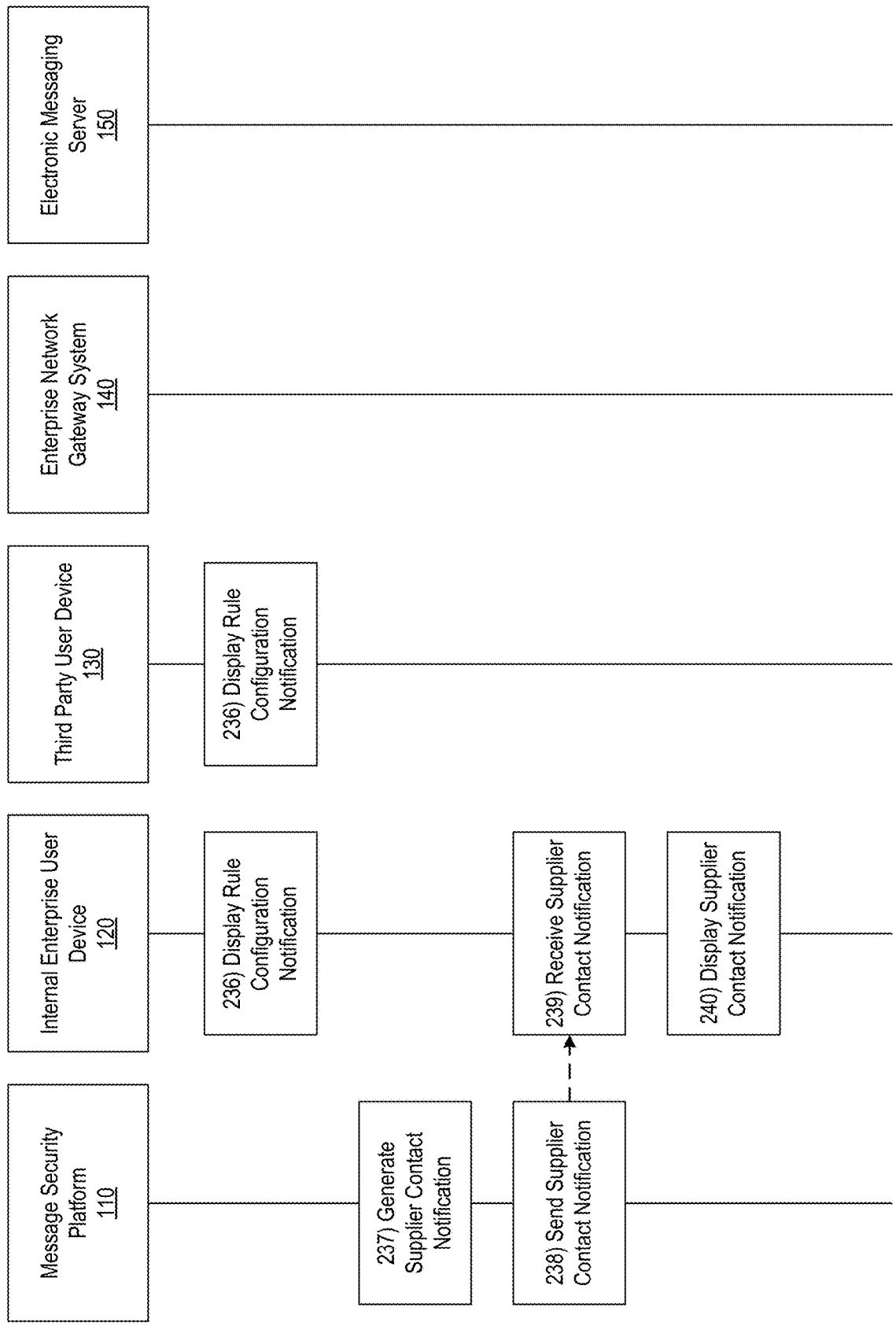

Referring to FIG. 2H, at step 236, the internal enterprise user device 120 and/or third party user device 130 may configure one or more rules based on the received one or more rule configuration commands received at step 235. For example, the internal enterprise user device 120 and/or third party user device 130 may configure messages from specified external entities (e.g., the external domain) to include an informational banner warning the recipient (e.g., an employee of the enterprise organization) to be vigilant when interacting with the message. Additionally or alternatively, the internal enterprise user device 120 and/or third party user device 130 may display a notification directing a user to update a security configuration of the enterprise network gateway system 140. Additionally or alternatively, the internal enterprise user device 120 and/or third party user device 130 may initiate and display a security awareness training program. In some instances, the rule configuration commands may be generated and sent to the internal enterprise user device 120 and/or third party user device 130 in addition or as an alternative to generation and display of the email authentication compliance notification described in steps 229-232

At step 237, based on the determination that a weighted grade did not exceed the second enhanced protection threshold, the message security platform 110 may generate a supplier contact notification. For example, the message security platform 110 may generate a notification indicating an external entity (e.g., a non-conforming vendor or supplier affiliated with the external domain) associated with one or more security issues, mitigation actions, or the like.

At step 238, the message security platform 110 may send, share, or otherwise provide the supplier contact notification to the internal enterprise user device 120. For example, the message security platform 110 may send the supplier contact notification to the internal enterprise user device 120 via the communication interface 113 and while the second data connection is established.

At step 239, the internal enterprise user device 120 may receive or otherwise access the supplier contact notification sent at step 238. For example, the internal enterprise user device 120 may receive the supplier contact notification while the second wireless data connection is established.

Figure 7:
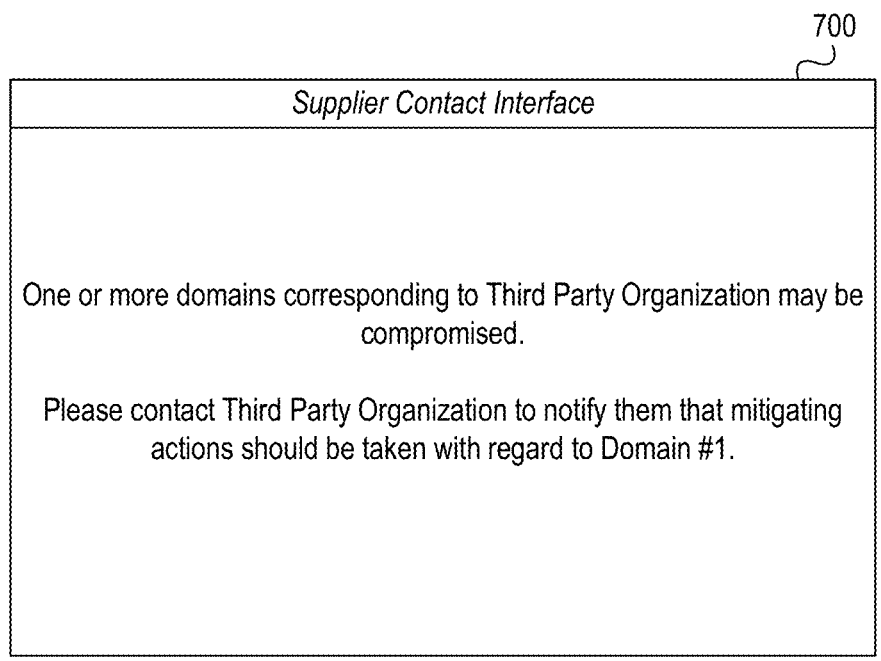

At step 240, the internal enterprise user device 120 may display the supplier contact notification. For example, the internal enterprise user device 120 may display a graphical user interface similar to graphical user interface 700, which is shown in FIG. 7. In displaying such a user interface, the internal enterprise user device 120 may display a graphical user interface indicating that a third party supplier should be contacted regarding one or more security issues, mitigation actions, or the like. In some instances, the generation and display of the supplier contact notification may occur in addition or as an alternative to generation and display of the DMARC compliance notification described in steps 229-232 and/or the rule configuration commands described in steps 233-236.

Figure 2I:
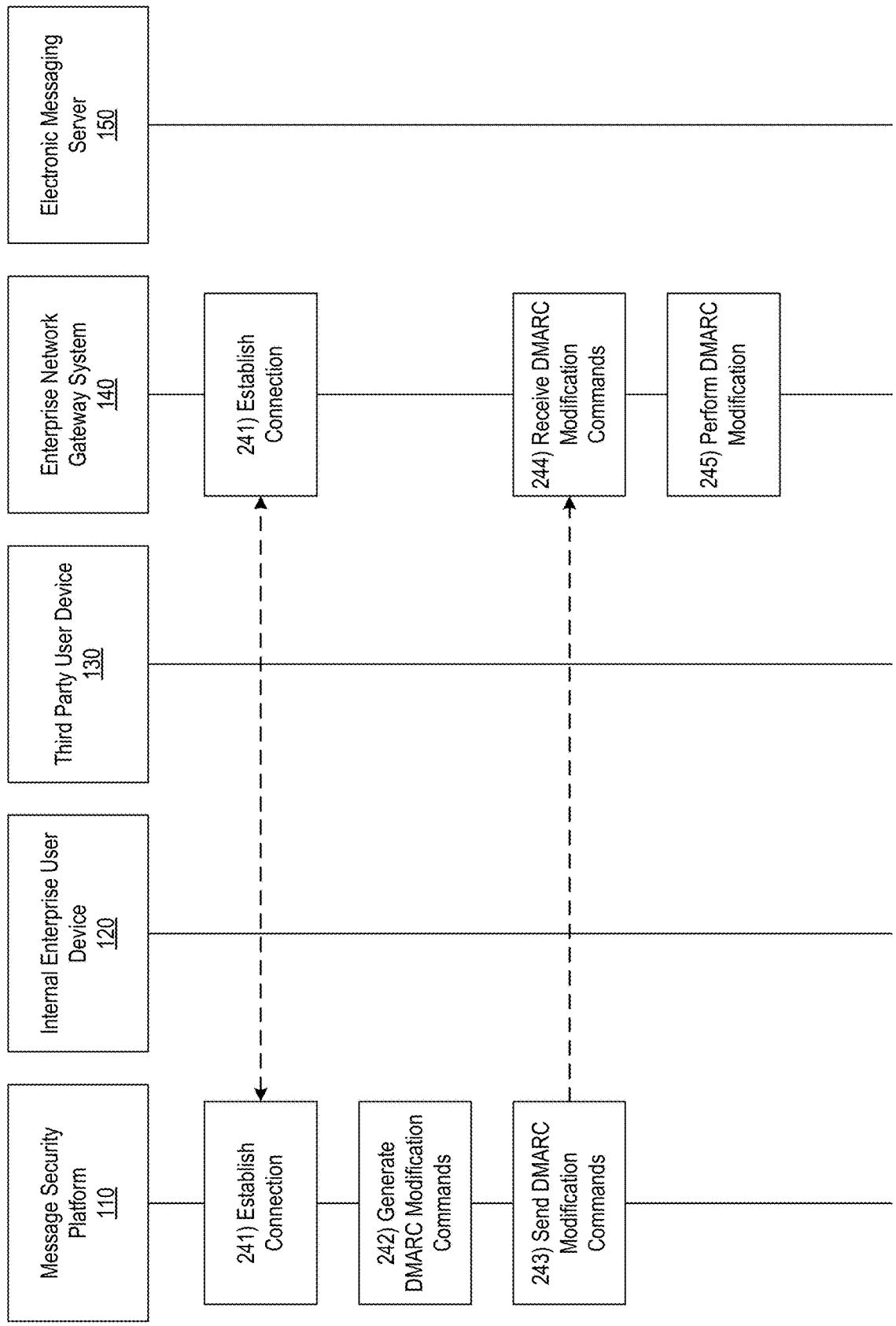

Referring to FIG. 2I, at step 241, the message security platform 110 may establish a connection with the enterprise network gateway system 140. For example, the message security platform 110 may establish a fourth data connection with the enterprise network gateway system 140 to link the message security platform 110 to the enterprise network gateway system 140 (e.g., in preparation for sending one or more DMARC compliance commands). In some instances, the message security platform 110 may identify whether or not a connection is already established with the enterprise network gateway system 140. If a connection is already established with the enterprise network gateway system 140, the message security platform 110 might not re-establish the connection. If a connection is not yet established with the enterprise network gateway system 140, the message security platform 110 may establish the fourth data connection as described herein.

At step 242, in addition or as an alternative to the informative protection actions described in steps 215-227 and/or the active protection actions described in steps 228-241, if the message security platform 110 previously determined that a weighted grade exceeded the second enhanced protection threshold at step 228, the message security platform 110 may initiate one or more automated protection actions as described in steps 242-253. Additionally or alternatively, the message security platform 110 may execute the one or more automated protection actions based on information determined by and/or received from other similar computing platforms operating with similar characteristics, which may be identified manually and/or automatically via machine learning techniques. For example, the message security platform 110 may generate one or more email authentication compliance commands directing the enterprise network gateway system 140 to enforce inbound email authentication verification (e.g., such as SPF, DKIM, DMARC, or other automated and/or manually configured trust and/or reputation metrics). For example, the message security platform 110 may determine that a third party organization has a respectable security grade (e.g., above a predetermined threshold), but that the third party organization does not have a deployed DMARC security policy. In these instances, the message security platform 110 may generate one or more commands that may cause an email authentication policy (e.g., a DMARC policy) to be applied to the third party organization.

At step 243, the message security platform 110 may send, share, or otherwise provide the one or more email authentication compliance commands to the enterprise network gateway system 140. For example, the message security platform 110 may send the one or more email authentication compliance commands to the enterprise network gateway system 140 via the communication interface and while the fourth data connection is established.

At step 244, the enterprise network gateway system 140 may receive or otherwise access the one or more email authentication compliance commands sent at step 243. For example, the enterprise network gateway system 140 may receive the one or more email authentication compliance commands while the fourth data connection is established.

At step 245, the enterprise network gateway system 140 may automatically modify one or more system or network policies to conform with an email authentication protocol (e.g., DMARC), execute one or more virtual authentication actions (e.g., virtual DMARC actions), or the like. For example, the enterprise network gateway system 140 may perform one or more actions at step 245 based on or in response to the one or more email authentication compliance commands received at step 244. For example, the enterprise network gateway system 140 may automatically apply a virtual DMARC policy to one or more specific domains (e.g., the external domain) to protect against spoofing.

Figure 2J:
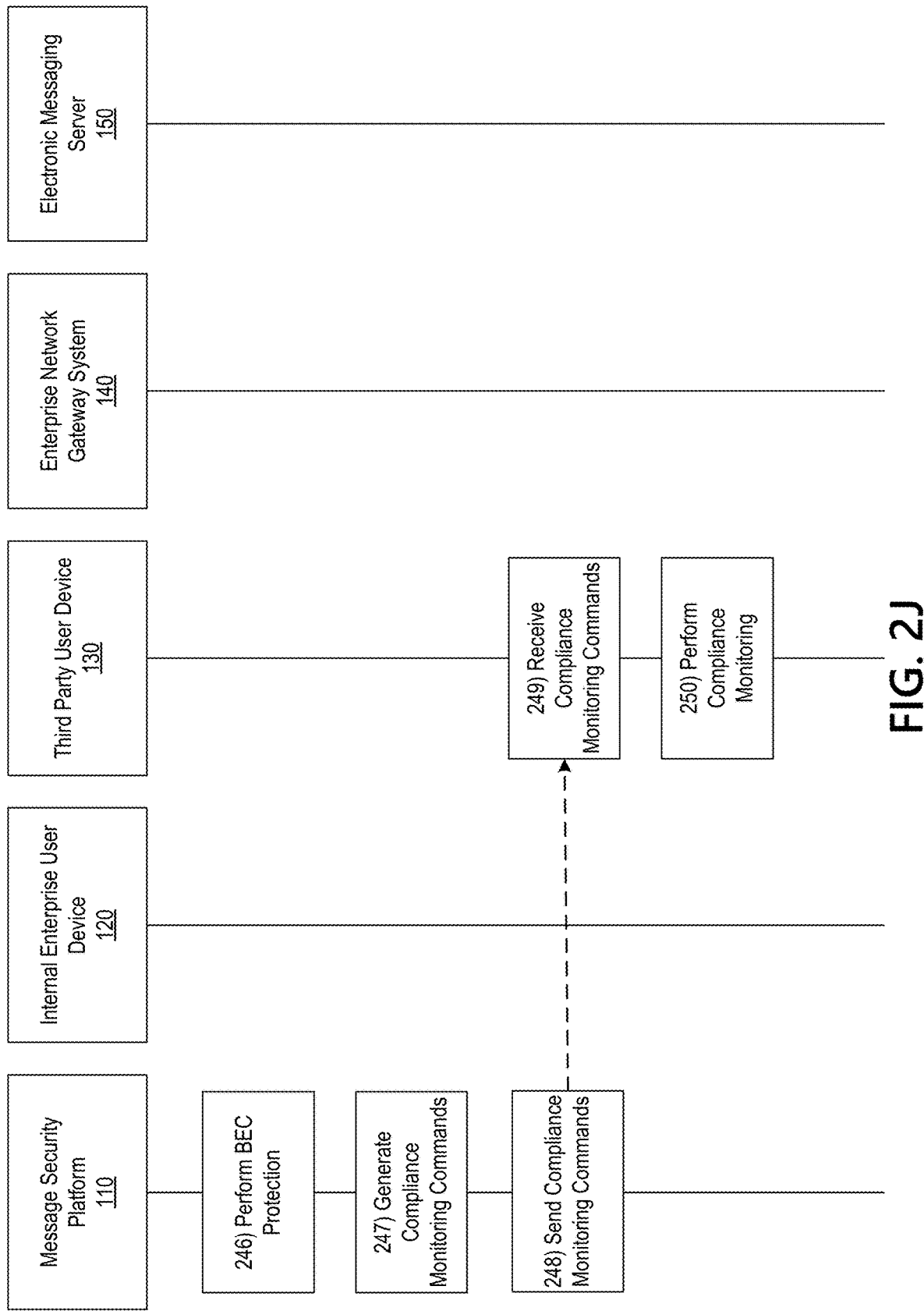

Referring to FIG. 2J, at step 246, the message security platform 110 may initiate one or more BEC protection actions. For example, the message security platform 110 may apply natural language processing to detect BEC attempts (e.g., spoofed emails sent to enterprise users originating from an email address corresponding to their boss's name and a consumer mailbox provider). In some instances, the message security platform 110 may initiate the one or more BEC protection actions based on or in response to the determination that the weighted grade exceeds the second enhanced protection threshold. In some instances, the message security platform 110 may initiate the one or more BEC protection actions in addition or as an alternative to the DMARC modifications/actions described in steps 243-245.

At step 247, the message security platform 110 may generate one or more compliance monitoring commands. For example, the message security platform 110 may generate one or more commands directing enterprise network gateway system 140 to monitor one or more domains (e.g., the external domain) for compliance with one or more policies (such as vendor risk management (VRM) policies), guidelines, or the like and to generate alerts when non-compliance is detected. In some instances, the message security platform 110 may perform the compliance monitoring itself (e.g., rather than directing the enterprise network gateway system 140 to perform these actions).

At step 248, the message security platform 110 may send, share, or otherwise provide the one or more compliance monitoring commands to the third party user device 130. For example, the message security platform 110 may send the one or more compliance monitoring commands to the third party user device 130 via the communication interface 113 and while the third data connection is established.

At step 249, the third party user device 130 may receive or otherwise access the one or more compliance monitoring commands sent at step 248. For example, the third party user device 130 may receive the one or more compliance monitoring commands while the third data connection is established.

At step 250, the third party user device 130 (or another computing system affiliated with the third party organization) may perform compliance monitoring (e.g., based on or in response to the one or more compliance monitoring commands received at step 249). For example, the third party user device 130 may monitor one or more domains (e.g., the external domain) for compliance with one or more policies, guidelines, or the like and may generate alerts when non-compliance is detected. In some instances, the third party user device 130 may receive a list of potentially compromised email addresses corresponding to the third party organization, and the third party organization may begin monitoring this list. In these instances, if the message security platform 110 detects an improved weighted grade corresponding to one or more of these email addresses, the message security platform 110 may notify the third party user device 130, and monitoring may be adjusted accordingly. In some instances, the third party user device 130 may automatically enroll individuals associated with the identified email addresses into a training program to test awareness of malicious messages. Additionally or alternatively, the third party user device 130 may cause messages originating from these email addresses to include warning or security banners based on the weighted scores (which may, in some instances, be unique based on a context or industry of the third party organization). In some instances, the compliance monitoring described in steps 247-250 may be performed in addition to or as an alternative to the DMARC actions described in steps 242-245 and/or the BEC protection actions described at step 246.

In some instances, the systems and event sequence described above may be modular, and may allow for the addition or removal of other modules and/or algorithms in addition to the relationship identification, security scoring, and enhanced protection processes described above. The steps described in the illustrative event sequence herein may be performed in any alternative sequence or order without departing from the scope of the disclosure.

Figure 8:
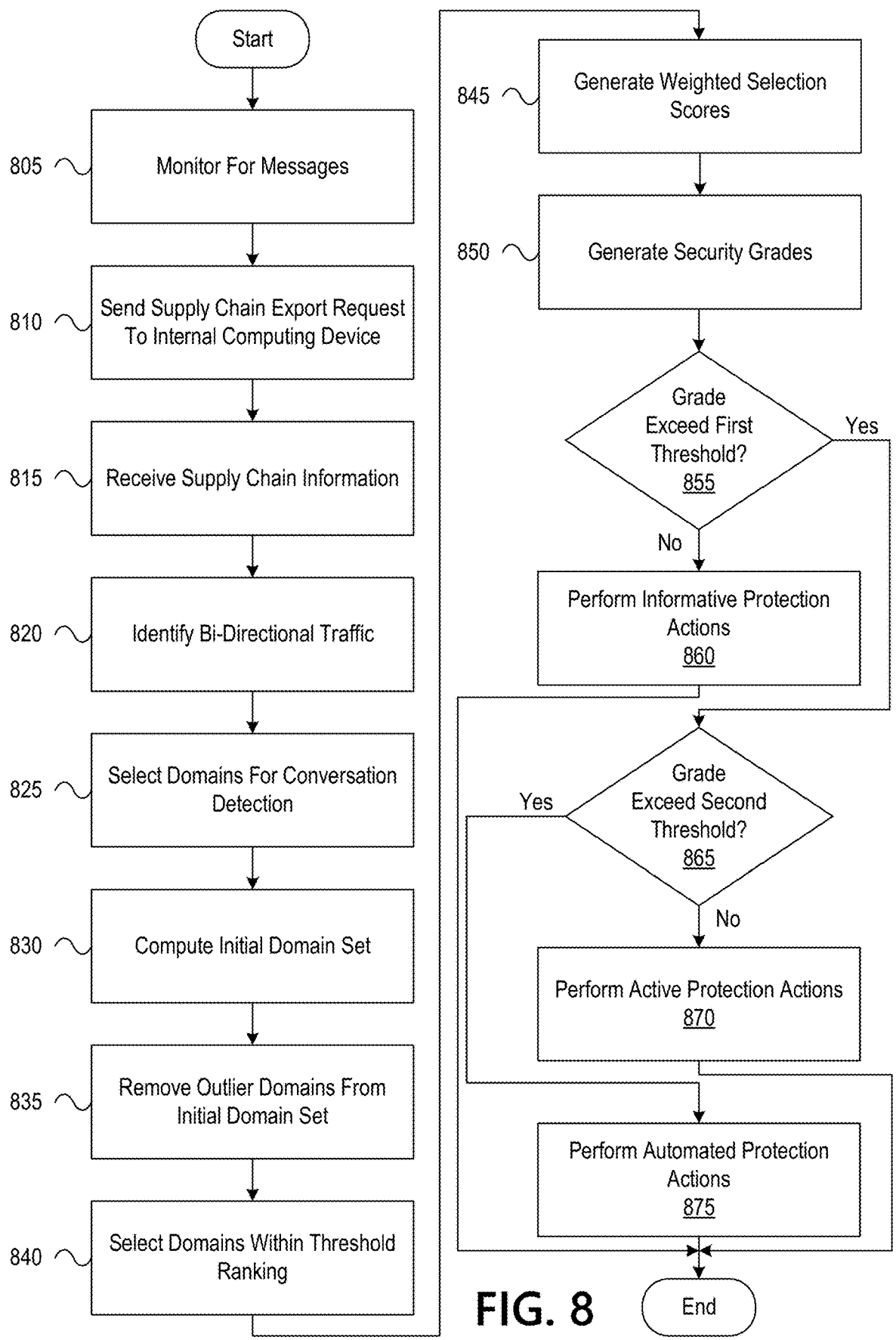
FIG. 8 depicts an illustrative method for performing dynamic message analysis and executing enhanced protection actions in accordance with one or more example embodiments.

FIG. 8 depicts an illustrative method for performing dynamic message analysis and executing enhanced protection actions in accordance with one or more example embodiments. Referring to FIG. 8, at step 805, a computing platform having at least one processor, a communication interface, and memory may monitor an electronic messaging server for messages. At step 810, the computing platform may send a request to an internal enterprise user device requesting supply chain information. At step 815, the computing platform may receive the supply chain information. At step 820, the computing platform may identify domains with bi-directional traffic included in the supply chain information. At step 825, the computing platform may select domains for a conversation detection process. At step 830, the computing platform may compute an initial domain set based on the selected domains. At step 835, the computing platform may remove outlier domains from the initial domain set. At step 840, the computing platform may select domains within a threshold ranking. At step 845, the computing platform may generate weighted selection scores for the domains within the threshold ranking. At step 850, the computing platform may generate security grades for the weighted selection scores. At step 855, the computing platform may identify whether or not the grades exceed a first enhanced protection threshold. For grades that do not exceed the first enhanced protection threshold, the computing platform may proceed to step 860. For grades that exceed the first enhanced protection threshold, the computing platform may proceed to step 865.

At step 860, the computing platform may perform one or more informative protection actions (e.g., generate reports, enhanced security configurations, guidelines, and/or perform other actions). At step 865, the computing platform may identify whether or not the grades exceed a second enhanced protection threshold. For grades that exceed the second enhanced protection threshold, the computing platform may proceed to step 875. For grades that do not exceed the second enhanced protection threshold, the computing platform may proceed to step 870.

At step 870, the computing platform may perform one or more active protection actions (e.g., DMARC compliance notifications, rule configuration commands, third party contact notifications, and/or other actions). At step 875, the computing platform may perform one or more automated protection actions (e.g., virtual DMARC actions, BEC protection actions, monitoring/alerting, and/or other actions).

Figure 9A:
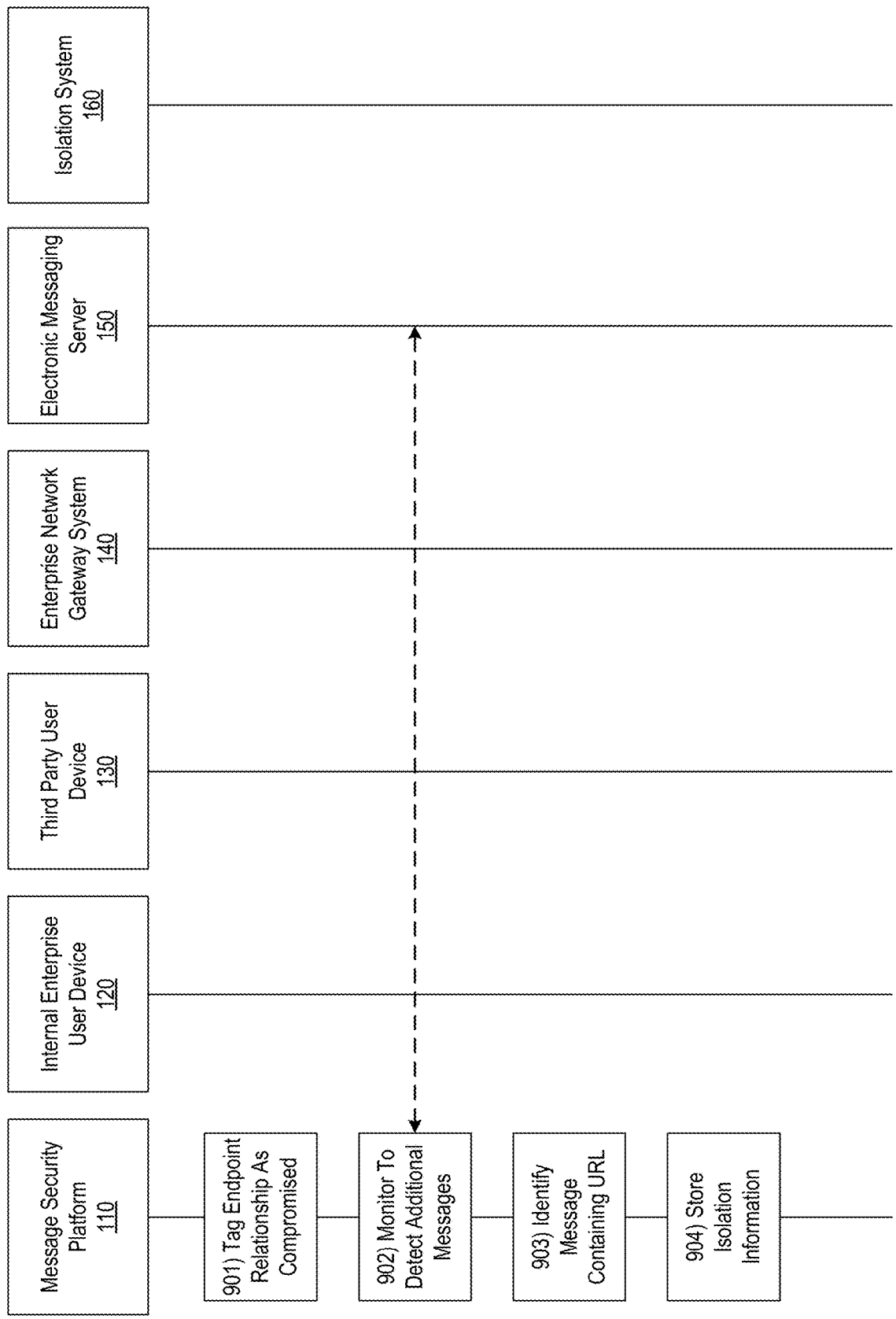

FIGS. 9A-9E depict an illustrative event sequence for performing dynamic message analysis and executing enhanced protection actions in accordance with one or more example embodiments. Referring to FIG. 9A, at step 901, the message security platform 110 may tag an endpoint relationship (which may e.g., be the result of a compromised endpoint or a compromised transit point affiliated with message sender domains, message recipient domains, and/or other domains described above with regard to FIGS. 2A-2J) corresponding to a weighted security score as compromised. For example, actions performed by the message security platform 110 at step 901 may be performed on endpoint relationships corresponding to security grades that fail to exceed the first enhanced protection threshold as identified based on the comparison performed at step 214 (which is described above with regard to FIG. 2C). In some instances, in tagging the endpoint relationship as compromised, the message security platform 110 may add the endpoint relationship to a list of known compromised endpoint relationships and/or otherwise store information indicating that the endpoint relationship is compromised. In some instances, these compromised endpoint relationships may include and/or result from a compromised domain, an impersonated domain, lookalike/spoofing attempts, other identity impersonation (e.g., direct domain spoofing, domain lookalikes, display name spoofing, email alias spoofing, subject header spoofing, and/or otherwise impersonated) and/or may be otherwise affiliated with a malicious user.

The endpoint relationship that may be analyzed and/or tagged by message security platform 110 at step 901 may include at least two endpoints (e.g., "nodes") and may include information indicating the directionality of the relationship between the at least two endpoints. An example illustrating such an endpoint relationship is depicted in FIG. 15. As seen in FIG. 15, an endpoint relationship may be characterized and/or made up of a set of information that includes scores applied to the following components: each endpoint in the endpoint relationship; the relationship between the endpoints in the endpoint relationship; and the directionality of the relationship (which may, e.g., be directional from one endpoint to another or may be bi-directional). An endpoint may, in some instances, be any one of: an end user who is sending and/or receiving messages; an application that is sending and/or receiving messages (e.g., automated transactional messages); and/or a server handling messages on behalf of other entities (e.g., users, applications). In some instances, the weighted security score (which, e.g., is discussed above) of the endpoint relationship may be determined by message security platform 110 by computing a composite endpoint relationship score based upon specific weightings applied to each component score and applying a final weighted grade (e.g., by using one or more of the scoring and weighting processes described above). In some instances, a message sent between unknown endpoints may transit any number of relay points. In these endpoints, the current endpoint relationship score may be impacted by one or more transit points. In some cases, messages sent as part of the same endpoint relationship may travel via different transit points, and a compromise in the endpoint relationship may be inferred and/or otherwise identified by inspecting the messages sent between the endpoints of the endpoint relationship.

Referring again to FIG. 9A, at step 902, the message security platform 110 may monitor the electronic messaging server 150 to detect messages of the compromised endpoint relationship. For example, the message security platform 110 may analyze sender domains corresponding to the messages at the electronic messaging server 150 to detect whether or not any messages indicate the endpoint relationship is compromised.

At step 903, the message security platform 110 may identify a first message from a compromised relationship endpoint that contains a URL. For example, the message security platform 110 may identify that a sender domain for the first message corresponds to the compromised relationship endpoint, and that the first message contains a URL. Additionally or alternatively, the platform 110 may identify that entirety of the endpoint relationship has been compromised. To do so, the message security platform 110 may apply one or more natural language processing (NLP) techniques, natural language understanding (NLU) techniques, character matching techniques, and/or other techniques.

In some instances, the message security platform 110 may enable a warning tag for the first message. For example, the message security platform 110 may enable a tag, to be displayed along with the first message, indicating that the first message may contain malicious content or otherwise be affiliated with a compromised or malicious domain or malicious sender.

At step 904, after identifying that the first message contains a URL, the message security platform 110 may store isolation information with the first message. For example, the message security platform 110 may store information indicating that the URL should be opened using an isolation environment. Additionally or alternatively, the message security platform 110 may rewrite (and/or direct an email filtering platform such as the electronic messaging server 150 to rewrite) a URL corresponding to the URL in the first message. For example, the message security platform 110 may rewrite the URL to point to a URL opening service (which may e.g., be provided by the message security platform 110) and/or an isolation service (which may e.g., be provided by the isolation system 160), rather than an original target destination of the URL.

Figure 9B:
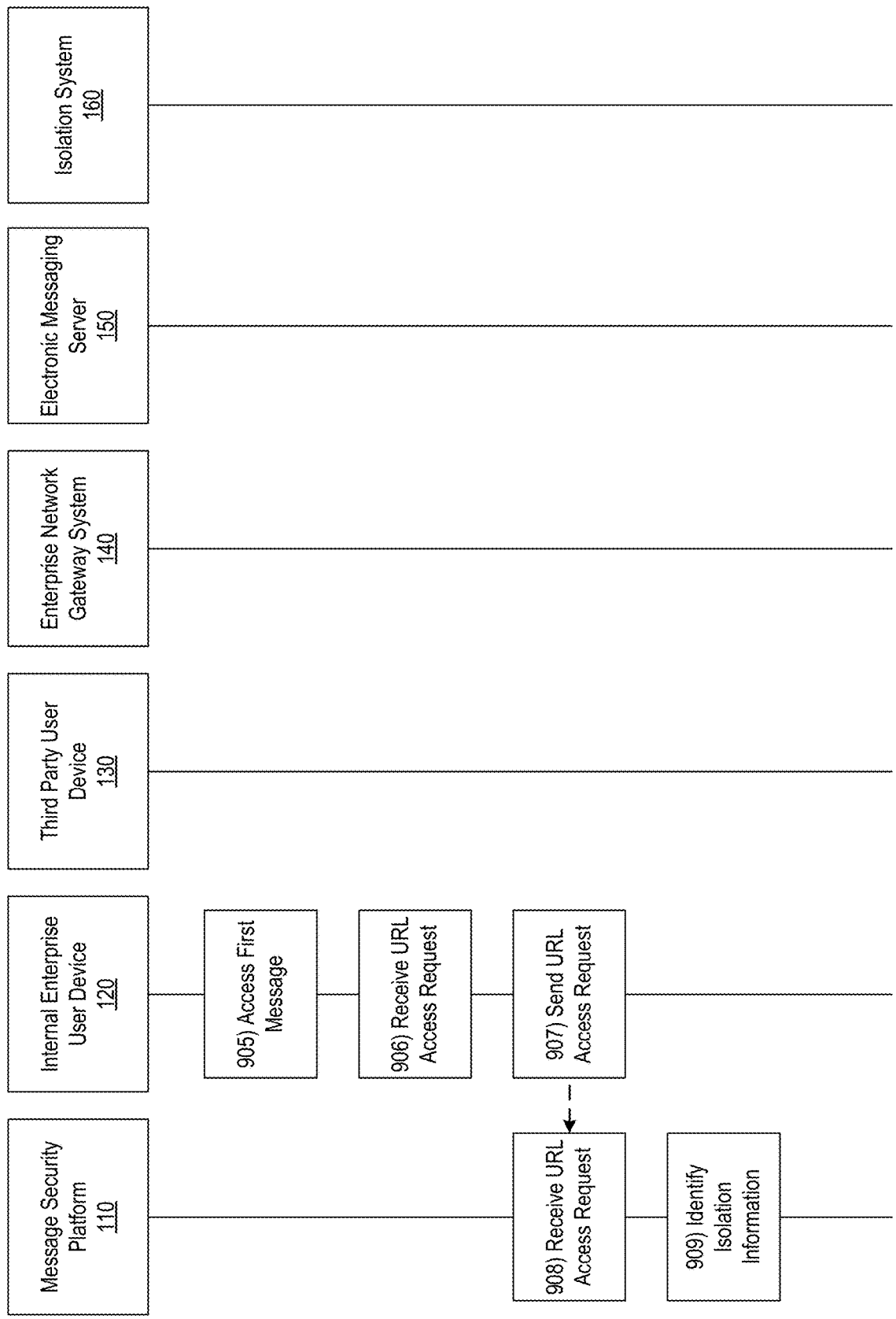

Referring to FIG. 9B, at step 905, the internal enterprise user device 120 may access the first message. For example, the internal enterprise user device 120 may send a request to the electronic messaging server 150 requesting access to the first message, and may cause display of the first message accordingly. For example, the internal enterprise user device 120 may cause display of an email, a text message, a chat message, or other type of electronic communication.

At step 906, the internal enterprise user device 120 may receive user input requesting access to the URL. For example, the internal enterprise user device 120 may receive a selection of the URL, requesting to cause navigation, on the internal enterprise user device 120, to a destination corresponding to the URL.

At step 907, the internal enterprise user device 120 may send a link access request to the message security platform 110 (e.g., in instances where the message security platform 110 rewrote the URL to point to the URL opening service, hosted by the message security platform 110). Alternatively, in instances where the message security platform 110 rewrote the URL to point to the isolation service (which may, e.g., be provided by the isolation system 160), the internal enterprise user device 120 may send a link access request to the isolation system 160.

At step 908, the message security platform 110 may receive the link access request sent at step 907. Alternatively, in some instances, the isolation system 160 may receive the link access request (e.g., depending on where the URL was rewritten to).

At step 909, in instances where the message security platform 110 received the link access request, the message security platform 110 may identify the isolation information corresponding to the compromised endpoint relationship (e.g., the isolation information stored at step 904). For example, the message security platform 110 may identify, based on the isolation information, that the link should be opened using the URL opening service. Alternatively, in instances where the isolation system 160 received the link access request, the isolation system 160 may proceed to step 911.

Figure 9C:
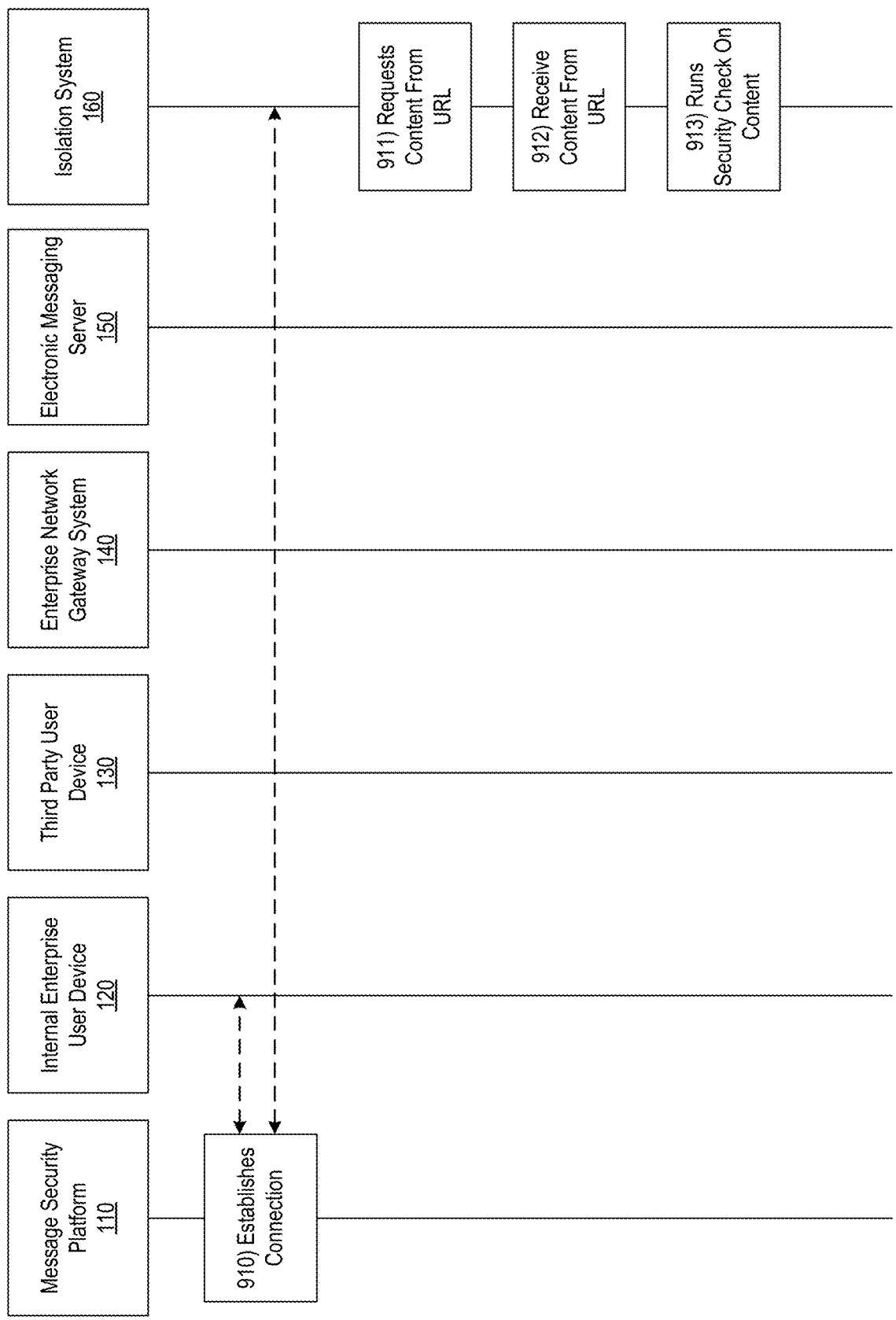

Referring to FIG. 9C, at step 910, the message security platform 110 may cause a connection to be established between the internal enterprise user device 120 and the isolation system 160. For example, the message security platform 110 may cause a connection to be established that may allow the internal enterprise user device 120 to access the URL at the isolation system 160.

At step 911, the isolation system 160 may request content corresponding to the URL. For example, the isolation system 160 may send a request for the content to a server corresponding to the URL (e.g., where the server stores the corresponding content).

At step 912, the isolation system 160 may receive the content (e.g., the content requested at step 911). For example, the isolation system 160 may receive the content from a server corresponding to the URL.

At step 913, the isolation system 160 may execute one or more security scans on the content. For example, the isolation system 160 may apply one or more analysis techniques to identify whether or not the content contains malicious content.

Figure 9D:
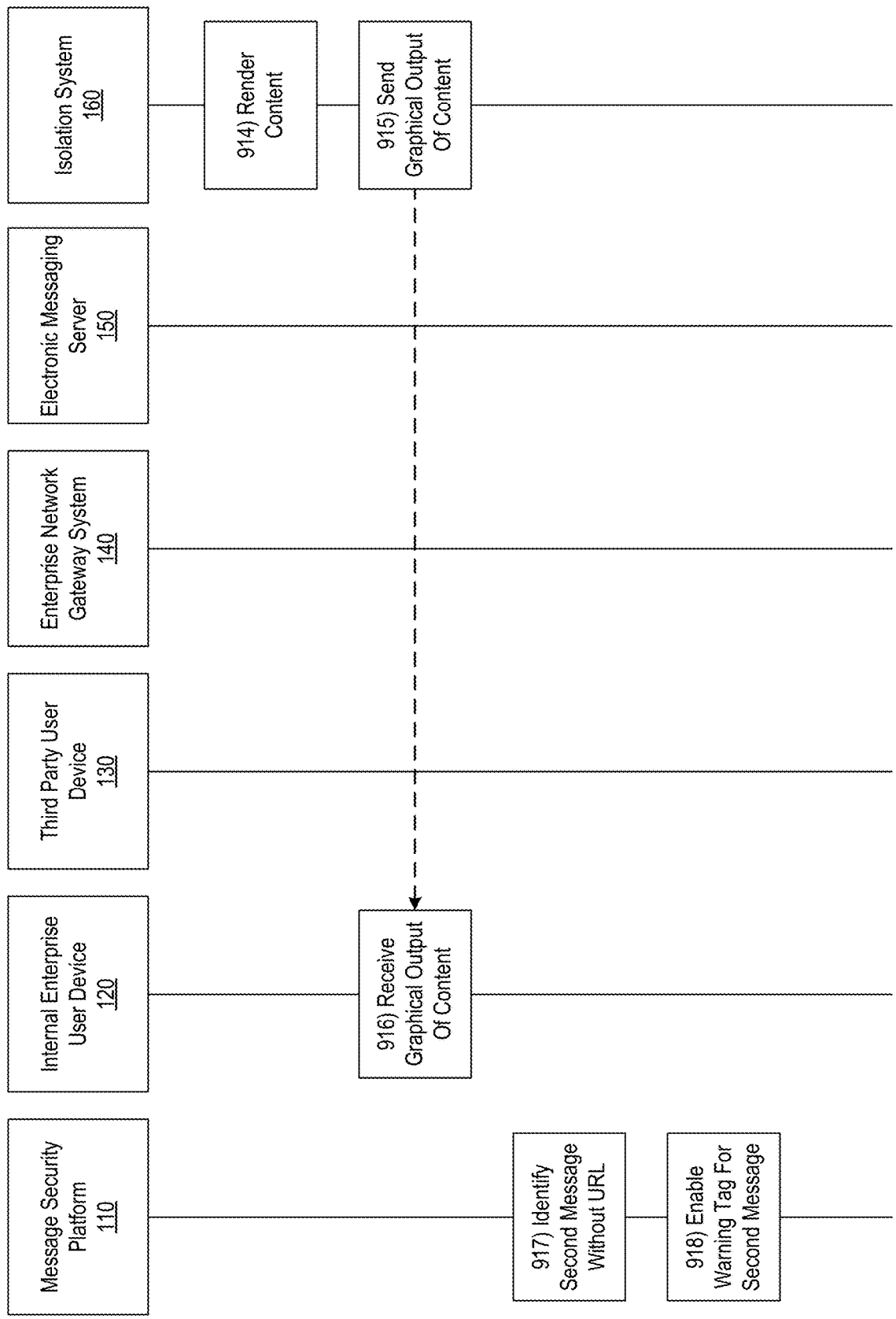

Referring to FIG. 9D, at step 914, assuming that the isolation system 160 did not identify malicious content at step 913, the isolation system 160 may render the content for display. For example, the isolation system 160 may generate a graphical output of the content.

At step 915, the isolation system 160 may send the graphical output of the content generated at step 914 to the internal enterprise user device 120. At step 916, the internal enterprise user device 120 may receive the graphical output of the content, sent at step 915. In these instances, the internal enterprise user device 120 may display the graphical output of the content, which may enable the internal enterprise user device 120 (and the corresponding user) to interact with the content (which may, e.g., be isolated content running at the isolation system 160).

At step 917, the message security platform 110 may identify a second message from the compromised relationship endpoint that does not contain a URL. For example, the message security platform 110 may identify that a sender domain for the second message corresponds to the compromised relationship endpoint, and that the second message does not contain a URL. To do so, the message security platform 110 may apply one or more natural language processing (NLP) techniques, natural language understanding (NLU) techniques, character matching techniques, and/or other techniques. In some instances, the message security platform 110 may detect that signals within the second message do not match signals (e.g., the existence of a URL with different domains) within the first message.

At step 918, based on identifying that the second message does originate from the compromised relationship endpoint but does not include a URL, the message security platform 110 may enable a warning tag for the second message. For example, the message security platform 110 may enable a tag, to be displayed along with the second message, indicating that the second message may contain malicious content or otherwise be affiliated with a compromised or malicious endpoint relationship. In some instances, the message security platform 110 may trigger the warning tag for the second message based on detecting that the signals from the second message do not match the signals from the first message.

At step 919, the internal enterprise user device 120 may access the second message. For example, the internal enterprise user device 120 may send a request to the electronic messaging server 150 requesting access to the second message.

Figure 11:
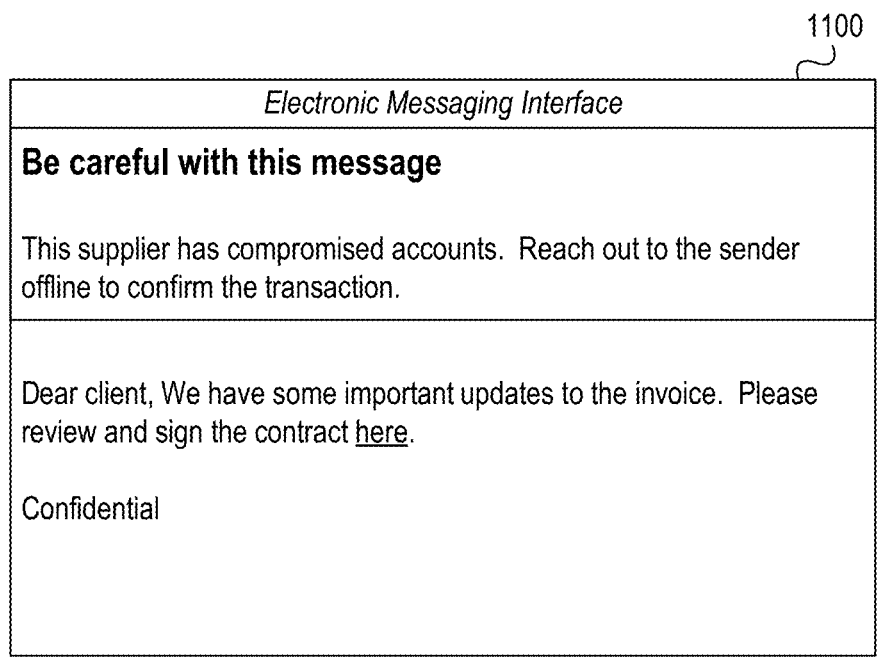
FIG. 11 depicts another illustrative user interface for performing dynamic message analysis and executing enhanced protection actions in accordance with one or more example embodiments.

At step 920, the internal enterprise user device 120 may cause display of the second message and the warning tag accordingly. For example, the internal enterprise user device 120 may cause display of an email, a text message, a chat message, or other type of electronic communication along with the warning tag. In some instances, the internal enterprise user device 120 may display a graphical user interface similar to graphical user interface 1100, which is shown in FIG. 11. For example, the internal enterprise user device 120 may display an electronic messaging interface that includes a message and an indication that the corresponding sender has several compromised accounts. In this way, the message security platform 110 may reduce the likelihood that the user of the internal enterprise user device 120 signs the requested contract (or otherwise interacts with the second message) without further confirmation from the sender.

Figure 10:
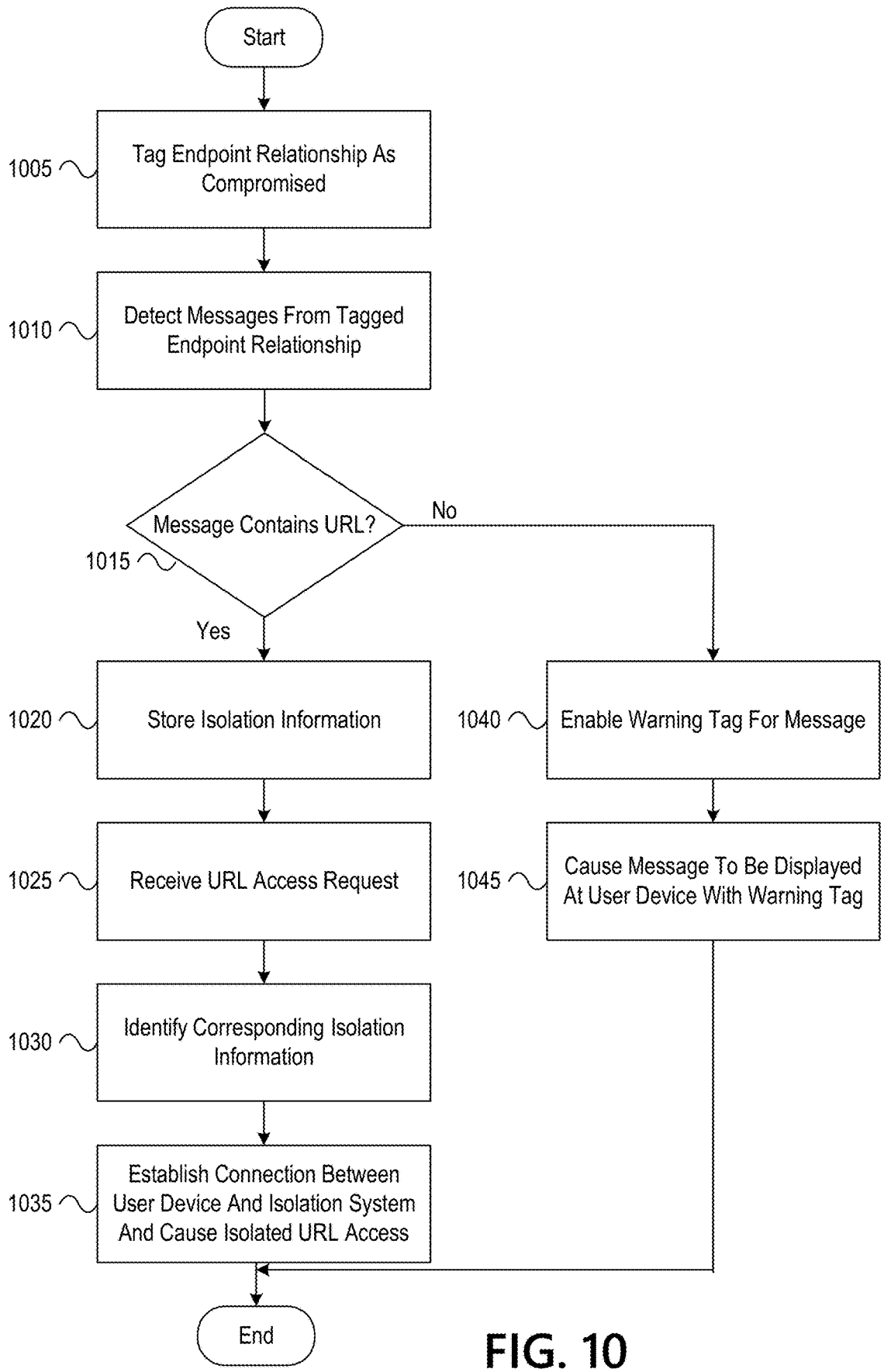
FIG. 10 depicts another illustrative method for performing dynamic message analysis and executing enhanced protection actions in accordance with one or more example embodiments.

FIG. 10 depicts an illustrative method for performing dynamic message analysis and executing enhanced protection actions in accordance with one or more example embodiments. Referring to FIG. 10, at step 1005, a computing platform having at least one processor, a communication interface, and memory may tag an endpoint relationship as compromised. At step 1010, the computing platform may detect messages from a relationship endpoint that has been tagged as compromised. At step 1015, the computing platform may identify whether or not the messages contain a link. For messages that do contain a link, the computing platform may proceed to step 1020. For messages that do not contain a link, the computing platform may proceed to step 1025.

At step 1020, the computing platform may store isolation information for the messages indicating that any included links should be accessed at an isolation system. At step 1025, the computing platform may receive a request to access a link in one or more of the messages. At step 1030, the computing platform may identify corresponding isolation information for the corresponding messages. At step 1035, the computing platform may establish a connection between the requesting user device and the isolation system, which may cause the user device to access the link at the isolation system.

Returning to step 1015, for messages that do not contain a link, at step 1040, the computing platform may enable a warning tag for display along with these messages. At step 1045, the computing platform may cause the messages to be displayed at the user device along with the warning tag.

Figure 12A:
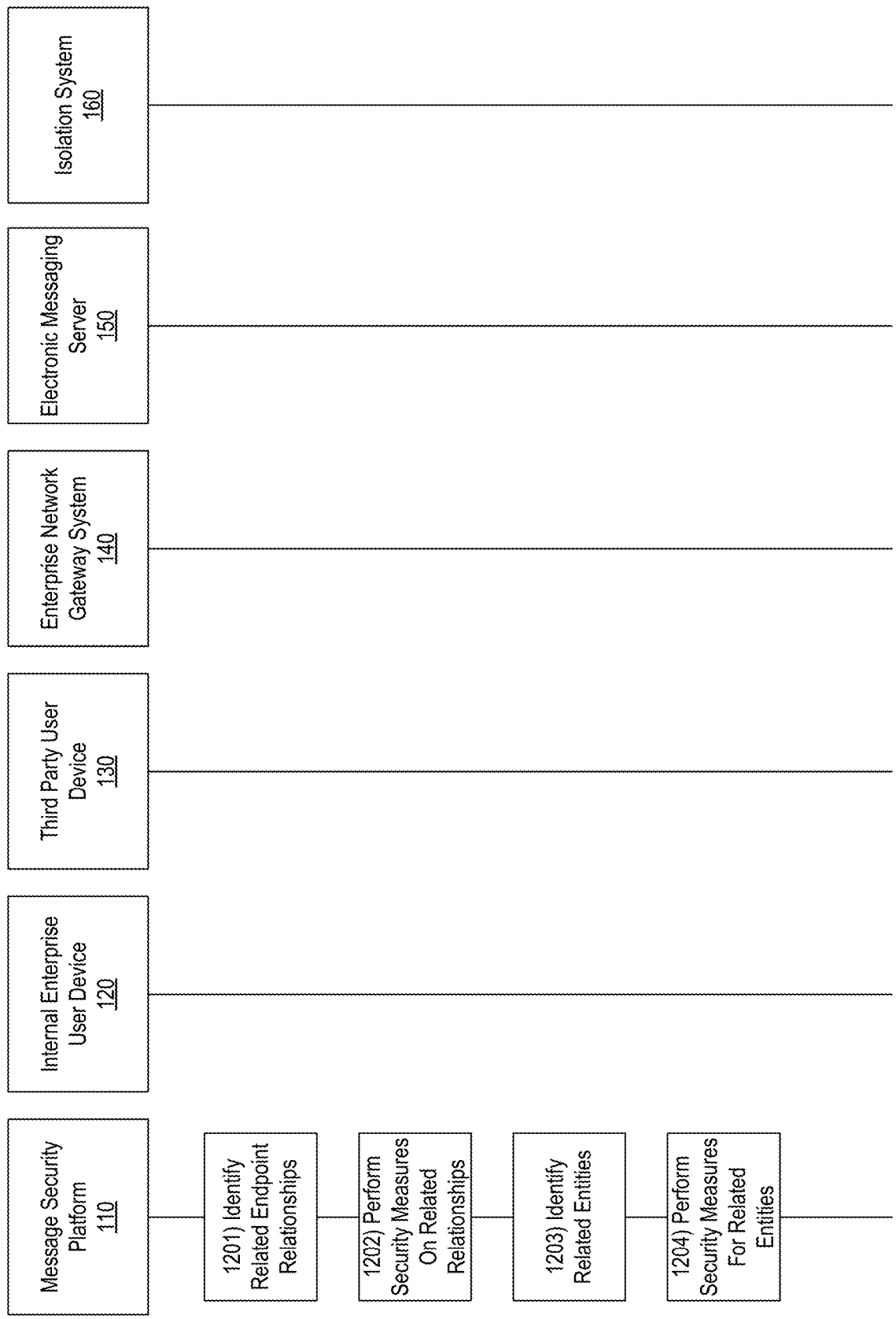

FIGS. 12A and 12B depict an illustrative event sequence for performing dynamic message analysis and executing enhanced protection actions in accordance with one or more example embodiments. Referring to FIG. 12A, at step 1201, the message security platform 110 may identify domains related to an endpoint relationship identified as compromised (e.g., the tagged endpoint relationship as described in step 901). For example, the message security platform 110 may identify an enterprise organization corresponding to the endpoint relationship, and may identify other domains (and/or endpoint relationships) corresponding to that enterprise organization. For example, the message security platform 110 may identify a parent organization for the enterprise organization, and may identify domains (and/or endpoint relationships) corresponding to each child organization. In some instances, to identify an enterprise organization based on a domain, the message security platform 110 may identify extract a portion of a domain (e.g., company#1.serviceprovider.com). Additionally or alternatively, the message security platform 110 may extract a portion of an email address (e.g., company#1@serviceprovider.com). Additionally or alternatively, the message security platform 110 may extract an entity from a subject header of a message. Additionally or alternatively, the message security platform 110 may identify lookalike entities (e.g., c0mpany#1.com).

At step 1202, the message security platform 110 may apply security measures as applied to the original compromised endpoint relationship to these additional related domains identified at step 1201. For example, the message security platform 110 may apply similar security measures as those described above with regard to steps 215-250 (e.g., generate reports, alerts, configurations, guidelines, DMARC compliance notifications, rule configuration notifications, supplier contact notifications, DMARC modification commands, generate compliance monitoring commands, and/or perform BEC protection actions). Additionally or alternatively, the message security platform 110 may cause one or more messages from these additional related domains to be displayed along with a warning tag (e.g., as described above with regard to steps 918-920) and/or URLs in messages corresponding to these additional related domains and/or relationship endpoints to be accessed using an isolation environment (e.g., as described above with regard to steps 901-916).

At step 1203, the message security platform 110 may identify other entities served by or otherwise in communication with the compromised relationship endpoint. For example, a particular vendor may correspond to the compromised relationship endpoint, and a plurality of entities may be in communication with that vendor. For example, the message security platform 110 may identify that vendor #1 is also in communication with clients #2, #3, and #4.

At step 1204, the message security platform 110 may perform one or more security measures for these related entities, identified at step 1203. For example, the message security platform 110 may apply similar security measures as those described above with regard to steps 215-250 (e.g., generate reports, alerts, configurations, guidelines, DMARC compliance notifications, rule configuration notifications, supplier contact notifications, DMARC modification commands, generate compliance monitoring commands, and/or perform BEC protection actions). Additionally or alternatively, the message security platform 110 may cause one or more messages to these additional entities (and/or from these additional entities if they are believed to be compromised) to be displayed along with a warning tag (e.g., as described above with regard to steps 918-920) and/or links in messages to these additional entities (and/or from these additional entities if they are believed to be compromised) to be accessed using an isolation environment (e.g., as described above with regard to steps 901-916).

Referring to FIG. 12B, at step 1205, the message security platform 110 may generate a supply chain monitoring interface. For example, the message security platform 110 may generate a navigable interface that may be used to show and analyze a number of identified cybersecurity threats based on the originally identified compromised endpoint relationship, the related domains, and/or the related entities. In some instances, in generating the supply chain monitoring interface, the message security platform 110 may generate an interface that includes general message security and/or supply chain security information, and that includes one or more selectable elements which, once selected, cause more detailed information to be displayed (e.g., a number of malicious messages sent from a particular domain or associated with a particular endpoint relationship to an individual enterprise organization, a number of malicious messages sent from the malicious domain and/or endpoint relationship to a plurality of enterprise organizations monitored by the message security platform 110, and/or other information).

At step 1206, the message security platform 110 may send the supply chain monitoring interface, generated at step 1205, to the internal enterprise user device 120. At step 1207, the internal enterprise user device 120 may receive the supply chain monitoring interface, sent at step 1206.

Figure 14:
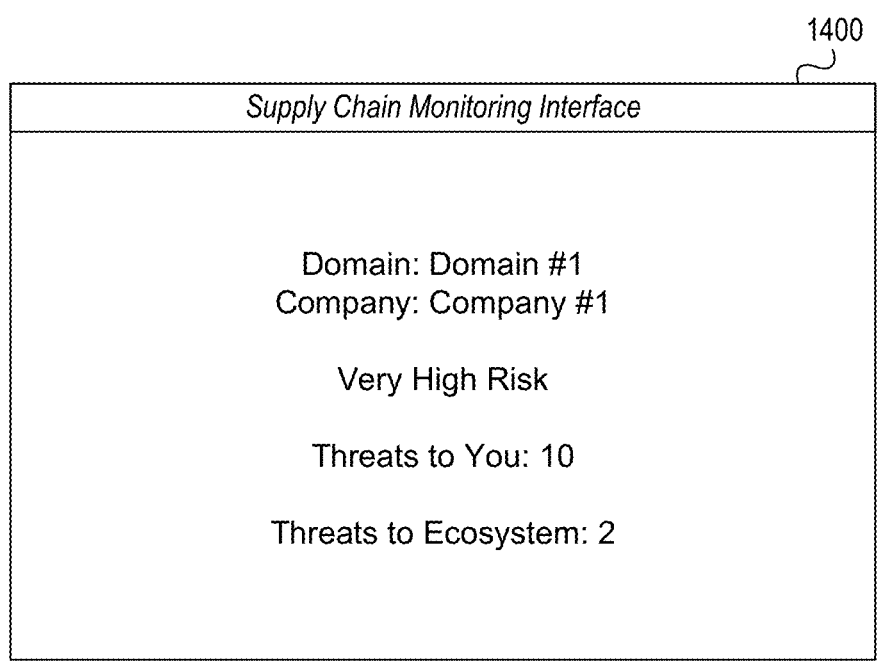
FIG. 14 depicts another illustrative user interface for performing dynamic message analysis and executing enhanced protection actions in accordance with one or more example embodiments.

At step 1208, the internal enterprise user device 120 may display the supply chain monitoring interface. For example, the internal enterprise user device 120 may display a graphical user interface similar to graphical user interface 1400, which is shown in FIG. 14. For example, the internal enterprise user device 120 may show a list of identified compromised or otherwise malicious endpoint relationships, additionally or alternatively the individual relationship endpoints, that may be selected by a user. Once selected, the internal enterprise user device 120 may show a company corresponding to the endpoint relationship, a number of threats from that company to an enterprise organization corresponding to the internal enterprise user device 120 (which may, e.g., include threats from related domains and/or endpoint relationships) and/or threats from the endpoint relationship/domain/company to other enterprise organizations (e.g., the related entities). In doing so, the internal enterprise user device 120 may display metrics (e.g., cyber security threat metrics) pertaining to individual organizations and across an entire ecosystem for various identified domains.

Figure 13:
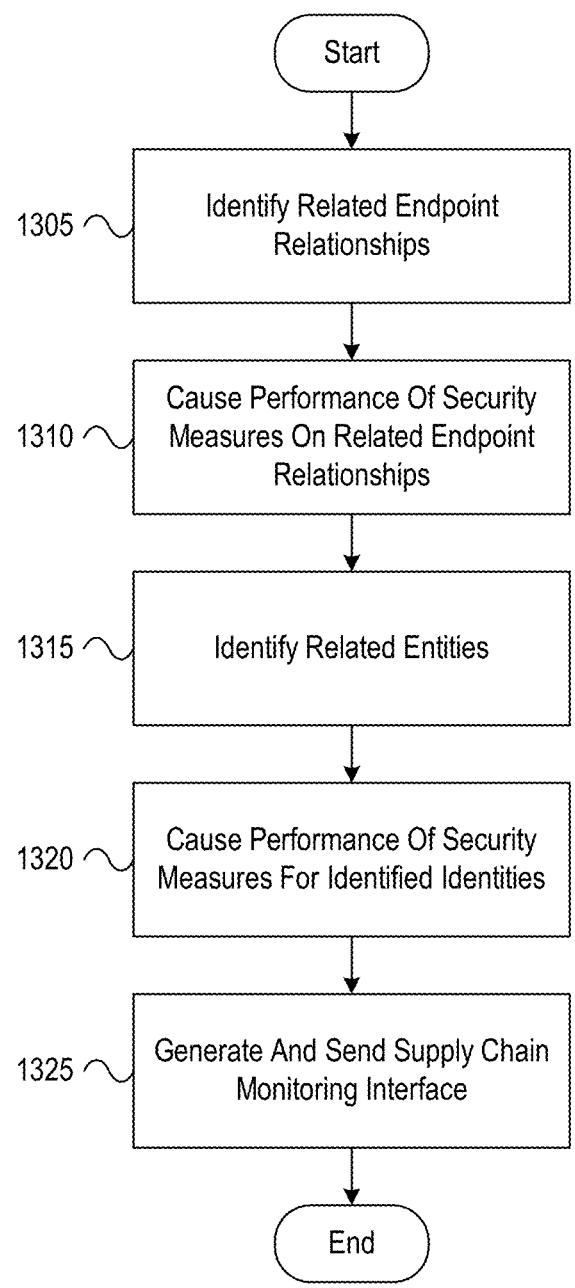
FIG. 13 depicts another illustrative method for performing dynamic message analysis and executing enhanced protection actions in accordance with one or more example embodiments.

FIG. 13 depicts an illustrative method for performing dynamic message analysis and executing enhanced protection actions in accordance with one or more example embodiments. Referring to FIG. 13, at step 1305, a computing platform having at least one processor, a communication interface, and memory may identify one or more domains related to a compromised endpoint relationship. At step 1310, the computing platform may cause performance of security measures, performed with regard to the compromised endpoint relationship, to the one or more related domains. At step 1315, the computing platform may identify entities related to or otherwise in communication with the compromised endpoint relationship. At step 1320, the computing platform may cause performance of security measures, performed with regard to the compromised endpoint relationship, to the one or more related entities. At step 1325, the computing platform may generate and send a supply chain monitoring interface for display at an enterprise user computing device.

The analysis processes, method steps, and/or methods described herein may be performed in different orders and/or in alternative arrangements from those illustrated herein, without departing from the scope of this disclosure. For example, in some instances, automated protection actions may be performed based on a determination that the first enhanced protection threshold is not exceeded, active protection actions may be performed based on a determination that the first enhanced protection threshold is exceeded but the second enhanced protection threshold is not exceeded, and informative protection actions may be performed based on a determination that the second enhanced protection threshold is exceeded. In doing so, automated protection actions may be performed for endpoint relationships corresponding to the worst grades, active protection actions may be performed for endpoint relationships corresponding to the middle grades, and informative protection actions may be performed for endpoint relationships corresponding to the best grades (e.g., because automated protection actions may be used to address more severe threats than informative protection actions). Additionally or alternatively, combinations of different actions (e.g., combinations of informative protection actions, active protection actions, and automated protection actions) may be performed with respect to the same endpoint relationship. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor;
a communication interface communicatively coupled to the at least one processor; and memory storing computer-readable instructions that, when executed by the at least one processor, cause the computing platform to:
apply a security scoring process to an endpoint relationship to compute a weighted security score for the endpoint relationship, wherein the endpoint relationship includes at least two endpoints, a relationship type, and information indicating a directionality of the endpoint relationship;
determine a weighted grade for the endpoint relationship based on the weighted security score for the endpoint relationship;
identify that the weighted grade exceeds a predetermined threshold;
based on identifying that the weighted grade exceeds the predetermined threshold, tag the endpoint relationship as compromised, wherein the tag is specific to the endpoint relationship, including the at least two endpoints, relationship type, and directionality of the endpoint relationship;
after tagging the endpoint relationship as comprised:
monitor an electronic messaging server to detect messages corresponding to the endpoint relationship that was tagged as compromised;
detect that the electronic messaging server has received a first message;
determine whether the first message involves an endpoint of the endpoint relationship that was tagged as compromised; and
in response to determining that the received first message involves the endpoint of the endpoint relationship that was tagged as compromised:
determine whether the first message includes a uniform resource locator (URL);
in response to determining that the first message includes a URL, rewrite the URL to point to a security service that is configured to open the URL in an isolation environment; and
in response to determining that the first message does not include a URL, apply a warning tag to the first message, the warning tag causing the first message to be displayed at a viewing device with a warning message.

2. The computing platform of claim 1, wherein applying the security scoring process to the endpoint relationship to compute the weighted security score for the endpoint relationship comprises applying a scoring process to each endpoint of the endpoint relationship to compute a combined endpoint relationship score, and wherein applying the scoring process to each endpoint includes:
determining that a first domain and a second domain are related;
determining a security score for the first domain and a security score for the second domain; and
determining a security score of a first endpoint of the endpoint relationship based on a combination of the first domain security score and the second domain security score.

3. The computing platform of claim 1, wherein the security service is hosted by one of: the computing platform or the isolation environment.

4. The computing platform of claim 1, wherein rewriting the URL to point to the security service that is configured to open the URL in the isolation environment causes the isolation environment to:
request content corresponding to the URL;
receive the content corresponding to the URL;
apply one or more security checks to the content corresponding to the URL;
render the content corresponding to the URL; and
send, based on the rendered content and to a user device, a graphical output.

5. The computing platform of claim 4, wherein sending the graphical output to the user device enables the user device to interact with the rendered content in the isolation environment.

6. The computing platform of claim 1, wherein the memory stores additional computer-readable instructions that, when executed by the at least one processor, cause the computing platform to:
detect that signals within a second message do not match signals within the first message; and
in response to detecting that the signals within the second message do not match the signals within the first message, trigger the second message to be displayed along with a warning label.

7. The computing platform of claim 1, wherein the memory stores additional computer-readable instructions that, when executed by the at least one processor, cause the computing platform to:
identify a parent organization corresponding to the endpoint relationship that was tagged as compromised;
identify additional endpoints associated with the parent organization corresponding to the endpoint relationship that was tagged as compromised;
detect that the electronic messaging server has received a second message corresponding to one of the additional endpoints associated with the parent organization corresponding to the endpoint relationship that was tagged as compromised, the second message comprising a second URL; and
based on detecting that the electronic messaging server has received the second message corresponding to the one of the additional endpoints associated with the parent organization corresponding to the endpoint relationship that was tagged as compromised, rewrite the second URL to point to the security service that is configured to open the URL in the isolation environment.

8. The computing platform of claim 1, wherein the first message corresponding to the endpoint of the endpoint relationship that was tagged as compromised is addressed to a first enterprise organization.

9. The computing platform of claim 8, wherein the memory stores additional computer-readable instructions that, when executed by the at least one processor, cause the computing platform to:
detect additional messages corresponding to the endpoint relationship that was tagged as compromised, wherein the additional messages are addressed to users at other enterprise organizations, different than the first enterprise organization;
identify a subset of the additional messages that include URLs; and
rewrite the URLs to point to the security service that is configured to open the URLs in the isolation environment.

10. The computing platform of claim 9, wherein the memory stores additional computer-readable instructions that, when executed by the at least one processor, cause the computing platform to:
identify a remainder of the additional messages that do not include URLs; and cause the remainder of the additional messages to be displayed with a warning label.

11. The computing platform of claim 10, wherein the memory stores additional computer-readable instructions that, when executed by the at least one processor, cause the computing platform to:

generate a supply chain monitoring interface, wherein the supply chain monitoring interface includes message security information, and wherein the supply chain monitoring interface includes one or more selectable elements that, once selected, cause display of information related to malicious messages associated with the endpoint relationship that are sent to an individual enterprise organization and information related to malicious messages associated with the endpoint relationship that are sent to a plurality of enterprise organizations monitored by the computing platform.

12. The computing platform of claim 1, wherein tagging the endpoint relationship as compromised includes one of more of:

pushing an alert to one or more user devices indicating that the endpoint relationship that was tagged as compromised is compromised, or configuring the alert for retrieval by the one or more user devices via application protocol interfaces (API).

13. A method comprising:

at a computing platform comprising at least one processor, a communication interface, and memory:

applying, by the at least one processor, a security scoring process to an endpoint relationship to compute a weighted security score for the endpoint relationship, wherein the endpoint relationship includes at least two endpoints, a relationship type, and information indicating a directionality of the endpoint relationship;

determining, by the at least one processor, a weighted grade for the endpoint relationship based on the weighted security score for the endpoint relationship;

identifying, by the at least one processor, that the weighted grade exceeds a predetermined threshold;

based on identifying that the weighted grade exceeds the predetermined threshold, tagging, by the at least one processor, the endpoint relationship as compromised, wherein the tagging is specific to the endpoint relationship, including the at least two endpoints, relationship type, and directionality of the endpoint relationship;

after tagging the endpoint relationship as comprised:

monitoring, by the at least one processor, an electronic messaging server to detect messages corresponding to the endpoint relationship that was tagged as compromised;

detecting, by the at least one processor, that the electronic messaging server has received a first message;

determining whether the first message involves an endpoint of the endpoint relationship that was tagged as compromised; and in response to determining that the received first message involves the endpoint of the endpoint relationship that was tagged as compromised:

determining whether the first message includes a uniform resource locator (URL);

in response to determining that the first message includes a URL, rewriting, by the at least one processor, the URL to point to a security service that is configured to open the URL in an isolation environment; and in response to determining that the first message does not include a URL, applying a warning tag to the first message, the warning tag causing the first message to be displayed at a viewing device with a warning message.

14. The method of claim 13, wherein applying the security scoring process to the endpoint relationship to compute the weighted security score for the endpoint relationship comprises applying a scoring process to each endpoint of the endpoint relationship to compute a combined endpoint relationship score.

15. The method of claim 13, wherein the security service is hosted by one of: the computing platform or the isolation environment.

16. The method of claim 13, wherein rewriting the URL to point to the security service that is configured to open the URL in the isolation environment causes the isolation environment to:

request content corresponding to the URL;

receive the content corresponding to the URL;

apply one or more security checks to the content corresponding to the URL;

render the content corresponding to the URL; and send, based on the rendered content and to a user device, a graphical output.

17. The method of claim 16, wherein sending the graphical output to the user device enables the user device to interact with the rendered content in the isolation environment.

18. The method of claim 13, comprising:

detecting, by the at least one processor, that signals within a second message do not match signals within the first message; and in response to detecting that the signals within the second message do not match the signals within the first message, triggering, by the at least one processor, the second message to be displayed along with a warning label.

19. The method of claim 13, comprising:

identifying, by the at least one processor, a parent organization corresponding to the endpoint relationship that was tagged as compromised;

identifying, by the at least one processor, additional endpoints associated with the parent organization corresponding to the endpoint relationship that was tagged as compromised;

detecting, by the at least one processor, that the electronic messaging server has received a second message corresponding to one of the additional endpoints associated with the parent organization corresponding to the endpoint relationship that was tagged as compromised, the second message comprising a second URL; and based on detecting that the electronic messaging server has received the second message corresponding to the one of the additional endpoints associated with the parent organization corresponding to the endpoint relationship that was tagged as compromised, rewriting, by the at least one processor, the second URL to point to the security service that is configured to open the URL in the isolation environment.

20. One or more non-transitory computer-readable media storing instructions that, when executed by a computing platform comprising at least one processor, a communication interface, and memory, cause the computing platform to:
- apply a security scoring process to an endpoint relationship to compute a weighted security score for the endpoint relationship, wherein the endpoint relationship includes at least two endpoints, a relationship type, and information indicating a directionality of the endpoint relationship;
- determine a weighted grade for the endpoint relationship based on the weighted security score for the endpoint relationship;
- identify that the weighted grade exceeds a predetermined threshold;
- based on identifying that the weighted grade exceeds the predetermined threshold, tag the endpoint relationship as compromised, wherein the tag is specific to the endpoint relationship, including the at least two endpoints, relationship type, and directionality of the endpoint relationship;
- after tagging the endpoint relationship as comprised:
  - monitor an electronic messaging server to detect messages corresponding to the endpoint relationship that was tagged as compromised;
  - detect that the electronic messaging server has received a first message;
  - determine whether the first message involves an endpoint of the endpoint relationship that was tagged as compromised; and
  - in response to determining that the received first message involves the endpoint of the endpoint relationship that was tagged as compromised:
    - determining whether the first message includes a uniform resource locator (URL);
    - in response to determining that the first message includes a URL, rewrite the URL to point to a security service that is configured to open the URL in an isolation environment; and
    - in response to determining that the first message does not include a URL, applying a warning tag to the first message, the warning tag causing the first message to be displayed at a viewing device with a warning message.

* * * * *